United States Patent [19]
Greiff

[11] Patent Number: 5,969,250
[45] Date of Patent: Oct. 19, 1999

[54] MICROMECHANICAL ACCELEROMETER HAVING A PERIPHERALLY SUSPENDED PROOF MASS

[75] Inventor: Paul Greiff, Wayland, Mass.

[73] Assignee: The Charles Stark Draper Laboratory, Inc., Cambridge, Mass.

[21] Appl. No.: 09/010,458

[22] Filed: Jan. 21, 1998

Related U.S. Application Data

[62] Division of application No. 08/602,512, Feb. 20, 1996, Pat. No. 5,760,305, which is a division of application No. 08/242,274, May 13, 1994, Pat. No. 5,605,598, which is a continuation-in-part of application No. 07/599,131, Oct. 17, 1990, Pat. No. 5,408,119.

[51] Int. Cl.⁶ .................................................. G01P 15/00
[52] U.S. Cl. ..................................... 73/514.38; 73/514.24
[58] Field of Search ........................... 73/514.38, 514.36, 73/514.29, 514.24, 514.18, 514.17, 514.32, 514.15, 514.01; 257/417, 419

[56] References Cited

U.S. PATENT DOCUMENTS

| Re. 32,931 | 5/1989 | Staudte | 73/505 |
|---|---|---|---|
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |

(List continued on next page.)

FOREIGN PATENT DOCUMENTS

| 55-121728 | 9/1980 | Japan | H03H 9/19 |
|---|---|---|---|
| 58-136125 | 8/1983 | Japan | H03H 9/17 |
| 59-037722 | 3/1984 | Japan | H03H 9/17 |
| 59-158566 | 9/1984 | Japan | H01L 29/84 |
| 61-144576 | 7/1986 | Japan | G01P 15/09 |
| 63-071256 | 8/1987 | Japan | H01L 27/06 |
| 62-221164 | 9/1987 | Japan | H01L 29/84 |
| 63-169078 | 7/1988 | Japan | H01L 29/84 |
| 2183040 | 5/1987 | United Kingdom | G01F 15/02 |
| 92/01941 | 2/1992 | WIPO | G01P 9/04 |
| 93/05401 | 3/1993 | WIPO | G01P 9/04 |

OTHER PUBLICATIONS

Barth, P.W. et al., "A Monolithic Silicon Accelerometer With Integral Air Damping and Overrange Protection," 1988 IEEE, pp. 35–38.

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Micromenhanical Inertial Guidance System and its Application," Fourteenth Biennial Guidance Test Symposium, vol. 1, Oct. 3–5, 1989, pp. 113–131.

Boxenhorn, B., et al., "Monolithic Silicon Accelerometer," *Transducers '89*, Jun. 25–30, 1989, pp. 273–277.

(List continued on next page.)

*Primary Examiner*—Hezron Williams
*Assistant Examiner*—Richard A. Moller
*Attorney, Agent, or Firm*—Weingarten, Schurgin, Gagnebin & Hayes LLP

[57] ABSTRACT

A monolithic, micromechanical vibrating beam accelerometer with a trimmable resonant frequency is fabricated from a silicon substrate which has been selectively etched to provide a resonant structure suspended over an etched pit. The resonant structure comprises an acceleration sensitive mass and at least two flexible elements having resonant frequencies. Each of the flexible elements is disposed generally collinear with at least one acceleration sensitive axis of the accelerometer. One end of at least one of the flexible elements is attached to a tension relief beam for providing stress relief of tensile forces created during the fabrication process. Mass support beams having a high aspect ratio support the mass over the etched pit while allowing the mass to move freely in the direction collinear with the flexible elements. Also disclosed is a method for fabricating such an accelerometer. Further disclosed is an alternative embodiment of the aforementioned accelerometer characterized by a low profile, and alternative planar processing methods for fabrication of these and other embodiments.

22 Claims, 16 Drawing Sheets

U.S. PATENT DOCUMENTS

| | | |
|---|---|---|
| 3,696,429 | 10/1972 | Tressa .................................... 343/180 |
| 3,913,035 | 10/1975 | Havens ................................ 331/107 R |
| 4,044,305 | 8/1977 | Oberbeck ............................ 324/154 R |
| 4,122,448 | 10/1978 | Martin ..................................... 343/7.7 |
| 4,144,764 | 3/1979 | Hartzell, Jr. ............................. 73/497 |
| 4,155,257 | 5/1979 | Wittke ...................................... 73/497 |
| 4,234,666 | 11/1980 | Gursky .................................... 428/573 |
| 4,321,500 | 3/1982 | Paros et al. ............................. 310/321 |
| 4,336,718 | 6/1982 | Washburn ............................. 73/517 B |
| 4,342,227 | 8/1982 | Petersen et al. ......................... 73/510 |
| 4,381,672 | 5/1983 | O'Connor et al. ....................... 73/505 |
| 4,406,992 | 9/1983 | Kurtz et al. ................................ 338/2 |
| 4,411,741 | 10/1983 | Janata ..................................... 204/1 T |
| 4,414,852 | 11/1983 | McNeill .................................... 73/765 |
| 4,447,753 | 5/1984 | Ochiai .................................... 310/312 |
| 4,468,584 | 8/1984 | Nakamura et al. .................... 310/370 |
| 4,478,076 | 10/1984 | Bohrer ..................................... 73/204 |
| 4,478,077 | 10/1984 | Bohrer et al. ............................ 73/204 |
| 4,483,194 | 11/1984 | Rudolf .................................. 73/517 R |
| 4,484,382 | 11/1984 | Kawashima ........................... 29/25.35 |
| 4,490,772 | 12/1984 | Blickstein .............................. 361/281 |
| 4,495,499 | 1/1985 | Richardson ......................... 343/5 DD |
| 4,499,778 | 2/1985 | Westhaver et al. ........................ 74/5 F |
| 4,502,042 | 2/1985 | Wuhrl et al. ........................... 340/568 |
| 4,522,072 | 6/1985 | Sulouff et al. ............................ 73/765 |
| 4,524,619 | 6/1985 | Staudte ..................................... 73/505 |
| 4,538,461 | 9/1985 | Juptner et al. ............................ 73/505 |
| 4,585,083 | 4/1986 | Nishiguchi .............................. 177/229 |
| 4,590,801 | 5/1986 | Merhav .................................... 73/510 |
| 4,592,242 | 6/1986 | Kempas ..................................... 74/5 F |
| 4,596,158 | 6/1986 | Strugach ................................... 74/5 F |
| 4,598,585 | 7/1986 | Boxenhorn ................................ 73/505 |
| 4,600,934 | 7/1986 | Aine et al. ................................ 357/26 |
| 4,619,001 | 10/1986 | Kane ....................................... 455/192 |
| 4,621,925 | 11/1986 | Masuda et al. ......................... 356/350 |
| 4,628,283 | 12/1986 | Reynolds ................................. 331/68 |
| 4,629,957 | 12/1986 | Walters et al. .......................... 318/662 |
| 4,639,690 | 1/1987 | Lewis ........................................ 331/96 |
| 4,644,793 | 2/1987 | Church ..................................... 73/505 |
| 4,651,564 | 3/1987 | Johnson et al. ........................... 73/204 |
| 4,653,326 | 3/1987 | Danel et al. .......................... 73/517 R |
| 4,654,663 | 3/1987 | Alsenz et al. ......................... 340/870.3 |
| 4,665,605 | 5/1987 | Kempas ..................................... 29/434 |
| 4,670,092 | 6/1987 | Motamedi ............................... 156/643 |
| 4,671,112 | 6/1987 | Kimura et al. ............................ 73/505 |
| 4,674,180 | 6/1987 | Zavracky et al. ......................... 29/622 |
| 4,674,319 | 6/1987 | Muller et al. ............................... 73/23 |
| 4,674,331 | 6/1987 | Watson .................................... 73/505 |
| 4,679,434 | 7/1987 | Stewart ................................. 73/517 B |
| 4,680,606 | 7/1987 | Knutti et al. ............................. 357/26 |
| 4,699,006 | 10/1987 | Boxenhorn ......................... 73/517 AV |
| 4,705,659 | 11/1987 | Bernstein et al. ...................... 264/29.6 |
| 4,706,374 | 11/1987 | Murkami ................................ 437/225 |
| 4,712,439 | 12/1987 | North ........................................ 74/84 R |
| 4,727,752 | 3/1988 | Peters .................................. 73/517 AV |
| 4,735,506 | 4/1988 | Pavlath ................................... 356/350 |
| 4,736,629 | 4/1988 | Cole ...................................... 73/517 R |
| 4,743,789 | 5/1988 | Puskas .................................... 310/316 |
| 4,744,248 | 5/1988 | Stewart ..................................... 73/505 |
| 4,744,249 | 5/1988 | Stewart ..................................... 73/505 |
| 4,747,312 | 5/1988 | Herzl .................................... 73/861.38 |
| 4,750,364 | 6/1988 | Kawamura et al. ...................... 73/510 |
| 4,761,743 | 8/1988 | Wittke .................................... 364/484 |
| 4,764,244 | 8/1988 | Chitty et al. ............................ 156/630 |
| 4,776,924 | 10/1988 | Delapierre .............................. 156/647 |
| 4,783,237 | 11/1988 | Aine et al. ................................ 437/15 |
| 4,789,803 | 12/1988 | Jacobsen et al. ....................... 310/309 |
| 4,792,676 | 12/1988 | Hojo et al. ......................... 250/231 GY |
| 4,805,456 | 2/1989 | Howe et al. ......................... 73/517 AV |
| 4,808,948 | 2/1989 | Patel et al. ................................. 331/4 |
| 4,834,538 | 5/1989 | Heeks et al. ............................ 356/350 |
| 4,851,080 | 7/1989 | Howe et al. ............................ 156/647 |
| 4,855,544 | 8/1989 | Glenn ............................... 200/61.45 R |
| 4,869,107 | 9/1989 | Murakami ............................ 73/517 R |
| 4,882,933 | 11/1989 | Petersen et al. ...................... 73/517 R |
| 4,884,446 | 12/1989 | Ljung ....................................... 73/505 |
| 4,890,812 | 1/1990 | Chechile et al. ........................ 248/674 |
| 4,893,509 | 1/1990 | McIver et al. ...................... 73/517 AV |
| 4,898,032 | 2/1990 | Voles ....................................... 73/505 |
| 4,899,587 | 2/1990 | Staudte .................................... 73/505 |
| 4,900,971 | 2/1990 | Kawashima ........................... 310/361 |
| 4,901,586 | 2/1990 | Blake et al. ......................... 73/862.59 |
| 4,916,520 | 4/1990 | Kurashima .............................. 357/71 |
| 4,922,756 | 5/1990 | Henrion ............................... 73/517 R |
| 4,929,860 | 5/1990 | Hulsing, II et al. .................... 310/366 |
| 4,981,359 | 1/1991 | Tazartes et al. ........................ 356/350 |
| 5,001,383 | 3/1991 | Kawashima ........................... 310/367 |
| 5,016,072 | 5/1991 | Greiff ...................................... 357/26 |
| 5,025,346 | 6/1991 | Tang ...................................... 361/283 |
| 5,038,613 | 8/1991 | Takenaka et al. ........................ 73/510 |
| 5,060,039 | 10/1991 | Weinberg et al. ........................ 357/26 |
| 5,090,809 | 2/1992 | Ferrar ..................................... 356/350 |
| 5,094,537 | 3/1992 | Karpinski, Jr. ......................... 356/350 |
| 5,138,883 | 8/1992 | Paquet et al. ............................ 73/504 |
| 5,195,371 | 3/1993 | Greiff ....................................... 73/505 |
| 5,203,208 | 4/1993 | Bernstein ................................. 73/505 |
| 5,205,171 | 4/1993 | O'Brien et al. ....................... 73/517 B |
| 5,216,490 | 6/1993 | Greiff et al. .......................... 73/517 R |
| 5,226,321 | 7/1993 | Varnham et al. ........................ 73/505 |
| 5,233,874 | 8/1993 | Putty et al. .......................... 73/517 AV |
| 5,241,861 | 9/1993 | Hulsing, II .............................. 73/505 |
| 5,591,910 | 1/1997 | Lin ...................................... 73/514.38 |

OTHER PUBLICATIONS

Boxenhorn, B., et al., "A Vibratory Micromechanical Gyroscope," AIAA Guidance, Navigation and Control Conference, Minneapolis, Aug. 15–17, 1988, pp. 1033–1040.

Howe, R., et al., "Silicon Micromechanics: Sensors and Actuators On a Chip," IEEE Spectrum, Jul. 1990, pp. 29–35.

Moskalik, L., "Tensometric Accelerometers with Overload Protection," Meas. Tech (USA), vol. 22, No. 12, Dec. 1979 (publ. May 1980), pp. 1469–1471.

Nakamura, M., et al., "Novel Electrochemical Micro–Machining and Its Application for Semiconductor Acceleration Sensor IC," *Digest of Technical Papers* (1987) Institute of Electrical Engineers of Japan, pp. 112–115.

Petersen, K.E. et al., "Micromechanical Accelerometer Integrated with MOS Detection Circuitry," IEEE, vol. ED–29, No. 1 (Jan. 1982), pp. 23–27.

Petersen, Kurt E., et al., "Silicon as a Mechaniel Material," *Proceedings of the IEEE*, vol. 70, No. 5, May 1982, pp. 420–457.

"Quartz Rate Sensor Replaces Gyros," *Defense Electronics*, Nov. 1984, p. 177.

Rosen, Jerome, "Machining In the Micro Domain," *Mechanical Engineering*, Mar. 1989, pp. 40–46.

Teknekron Sensor Development Corporation, article entitled "Micro–Vibratory Rate Sensor," 1080 Marsh Road, Menlo Park, CA 94025, 2 pages, undated.

Bryzek, Janusz et al., "Micromachines on the March," IEEE Spectrum, May 1994, pp. 20–31.

MICROMECHANICAL ACCELEROMETER HAVING A PERIPHERALLY SUSPENDED PROOF MASS

RELATED APPLICATIONS

This application is a divisional of U.S. patent application Ser. No. 08/602,512, filed Feb. 20, 1996, now U.S. Pat. No. 5,760,305, which is a divisional of U.S. patent application Ser. No. 08/242,274, filed May 13, 1994, now U.S. Pat. No. 5,605,598, which is a continuation-in-part of U.S. patent application Ser. No. 07/599,131, filed Oct. 17, 1990, now U.S. Pat. No. 5,408,119.

FIELD OF THE INVENTION

This invention relates to inertial force transducers and more particularly, to micromechanical inertial force transducers and methods for making the same.

BACKGROUND OF THE INVENTION

Accelerometers serve as one of the major sensors used in inertial navigation systems as well as various other safety and control systems.

Accurate and reliable accelerometers require great precision and uniform operating results. Prior art accelerometers are generally assembled from a number of components which creates tremendous assembly problems associated with such precision devices. In addition, these accelerometers are typically large and may not be radiation hard.

Although other prior art accelerometers are fabricated utilizing a micromechanical process, no provisions are made for electrically isolating the proof mass from the flexures which is required to accurately and independently drive and sense the resonant frequency of each of the flexures. Additionally, none of these prior art devices have provided reliable means for easily and accurately adjusting the natural resonant frequency of the flexure. Stresses from sources such as impurity doping affect device performance and reliability in the absence of stress relief. Similarly, strain introduced by mechanical bending or thermal stress in the substrate also affects performance due to a lack of strain relief.

Some prior art accelerometers fabricated by a micromechanical process use anodic bonding of a glass substrate containing electrodes to a silicon substrate containing an active silicon device. However, a number of disadvantages associated with silicon-on-glass devices are known. Anodic bonding, typically undertaken at 370 degrees centigrade and using 900 Volts DC, is complicated by the necessity of maintaining the glass and silicon substrates in precise alignment. Such alignment during bonding is additionally complicated by a difference in thermal characteristics between glass and silicon; stress is observed as a result of thermal mismatch. Curling of the silicon substrate from the glass substrate is also commonly observed. Bonding glass and silicon substrates allows foreign matter to lodge in the gap between the proof mass and electrodes or substrate, thus degrading device performance. Further, glass substrates are incompatible with other on-chip circuitry, and are subject to undesirable charge build-up.

Silicon-on-sapphire is also known in the art as a common silicon-on-insulator (SOI) starting material for micromechanical sensors. However, expense and contamination issues have limited the usefulness of this substrate.

SUMMARY OF THE INVENTION

This invention features a monolithic, micromechanical, vibrating beam accelerometer with a trimmable resonant frequency fabricated from a silicon substrate which has been selectively etched to provide a resonant structure suspended over an etched pit. The resonant structure comprises an acceleration sensitive mass and at least two flexible elements each having a natural resonant frequency and each disposed generally collinear with at least one acceleration sensitive axis of the accelerometer. A first end of each of the flexible elements is attached to opposite sides of the mass while at least one of the second ends are attached to at least one tension relief beam for providing stress relief of tensile forces between the suspended elements and the body of the structure.

In a first embodiment, there are first and second tension relief beams located adjacent removable regions of the resonant structure, for facilitating removal of a portion of the removable regions and increasing the length and width of the opening forming the tension relief beam. Enlarging the opening forming the tension relief beams allows for trimming the resonant frequency of the flexible elements. The first embodiment further includes mass support beams having a high height-to-width ratio, for supporting the mass over the etched pit. The first embodiment further includes drive electronics for causing the flexible elements to resonate at a resonant frequency, and sense electronics to measure the frequency of the resonating flexible elements by sensing capacitance variations between a sense electrode and the resonating flexible element.

An alternative embodiment of the monolithic, micromechanical, vibrating beam accelerometer comprises rebalance electrodes disposed generally orthogonal to the acceleration sensitive axis of the accelerometer and adjacent to the acceleration sensitive mass. The provision of rebalance electrodes enables operation of the accelerometer in a closed loop mode, thus providing a more sensitive device having a larger dynamic range and allowing self test using the rebalance electrodes as a source for known excitation.

This invention also includes methods for fabricating a monolithic, micromechanical vibrating accelerometer with a trimmable resonant frequency, as well as other micromechanical devices. The methods begin with a standard silicon-on-insulator (SOI) wafer. Electrodes and anchor points are formed by masking and doping an intermediate layer with an etch-resistant material.

In two processes described herein, one epitaxial layer is disposed on the intermediate layer. This epitaxial layer is then doped with an etch-resistant material to define elements of the device such as the proof mass and flexible elements. An etchant, anisotropic or electrochemical, frees the elements of the device.

In two other processes described herein, a first epitaxial layer is deposited on the SOI wafer to an electrode gap thickness. A second, doped epitaxial layer is then employed to define the device elements. Once again, anisotropic or electrochemical etching is used to free the elements of the device.

Additionally, the present invention provides alternative planar processing methods for fabricating micromechanical transducers having at least one central anchor, a peripheral suspended proof mass, at least two flexible elements formed between the proof mass and the at least one central anchor, a first plurality of mass support elements also formed therebetween, and a second plurality of mass support elements formed between the peripheral proof mass and peripheral anchors. In a further embodiment, the low-profile vibrating beam accelerometer has at least one rebalance electrode formed adjacent the peripheral suspended proof mass.

DESCRIPTION OF THE DRAWINGS

These and other features and advantages of the present invention are described below in the following description and the accompanying drawings in which.

DETAILED DESCRIPTION OF THE INVENTION

A monolithic, micromechanical vibrating beam accelerometer with trimmable resonant frequency according to the present invention is fabricated from a single silicon substrate 12 employing the technique of selective oxide removal, diffusions into the substrate through the removed oxide regions, and anisotropic etching. Such methods will be further described herein and are also fully disclosed in Applicant's U.S. Pat. No. 5,195,371 entitled "Method and Apparatus for Semi-Conductor Chip Transducer" which is incorporated herein by reference.

Figure 1:
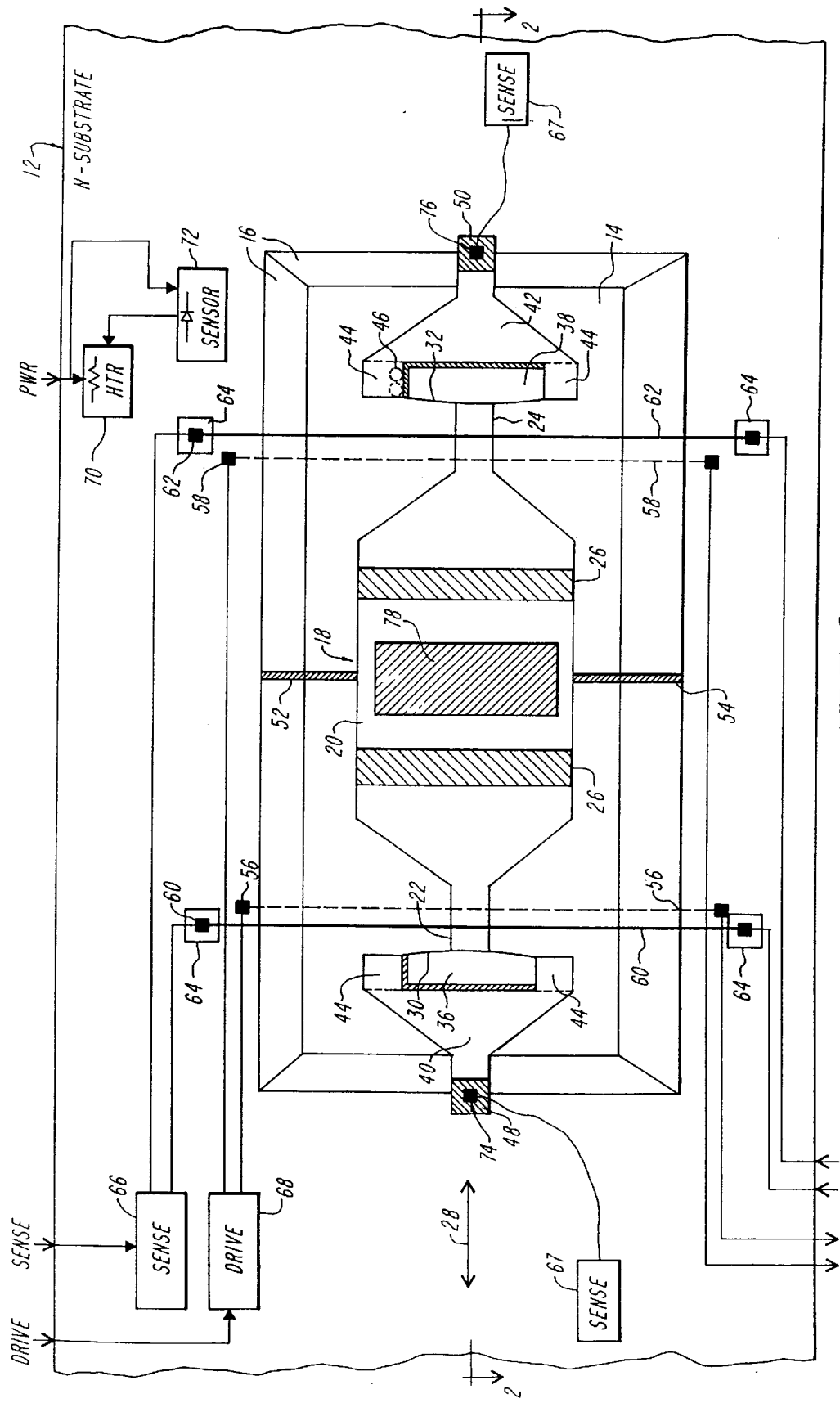
FIG. 1 is a top view of a schematic representation of the micromechanical vibrating beam accelerometer including the tension relief and mass support beams according to the present invention.
Figure 2:
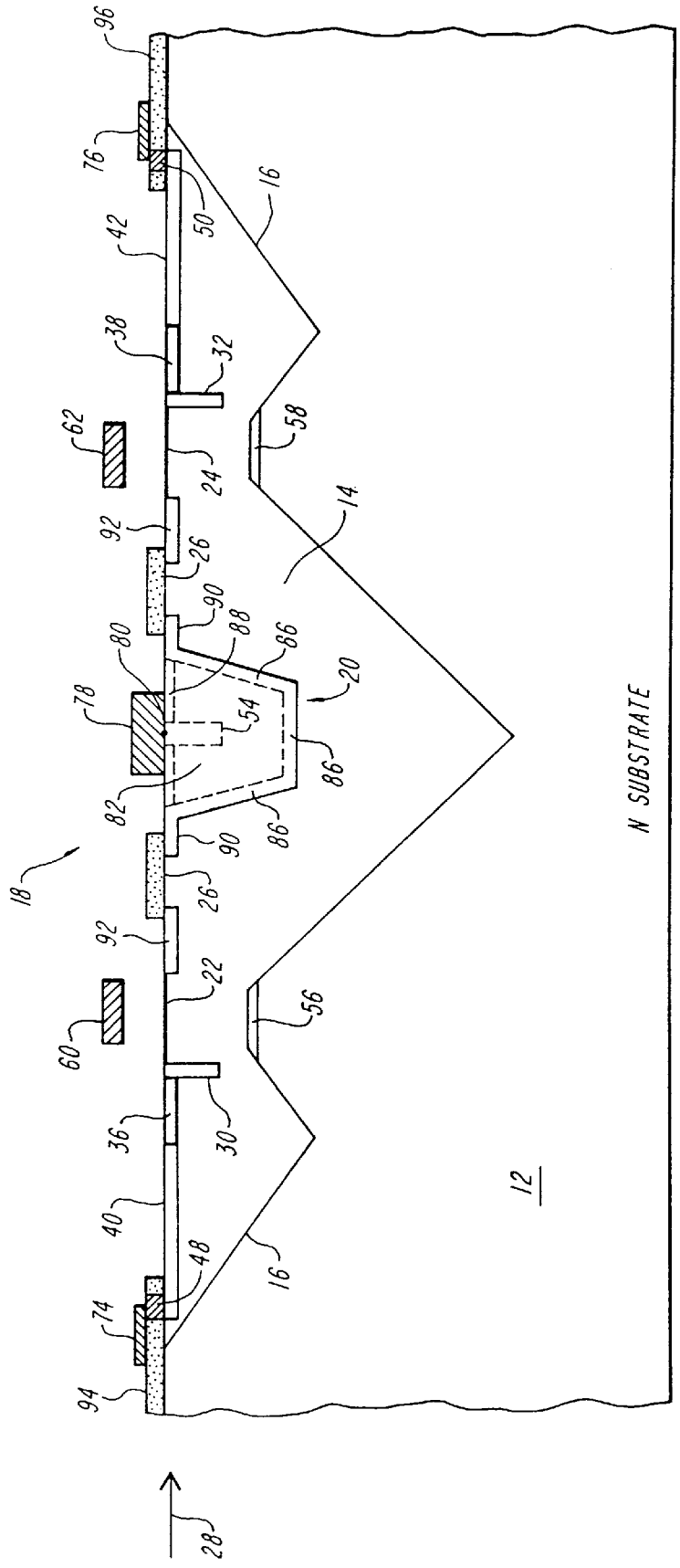
FIG. 2 is a cross-sectional view of the micromechanical vibrating beam accelerometer of FIG. 1 taken along lines 2—2.

According to FIGS. 1 and 2, etch stop diffusions and subsequent selective anisotropic etching create etched pit 14 having sloped sidewalls 16. Suspended over etched pit 14 is micromechanical vibrating beam accelerometer plate 18 formed on a suspended silicon doped silicon plate and comprising a central proof mass 20 on plate 18. Plate 18 is supported by flexible support elements 22 and 24. Flexible elements 22 and 24 are electrically isolated from proof mass 20 such as by transverse breaks in plate 18 physically joined by dielectric lap joints 26.

Figure 3:
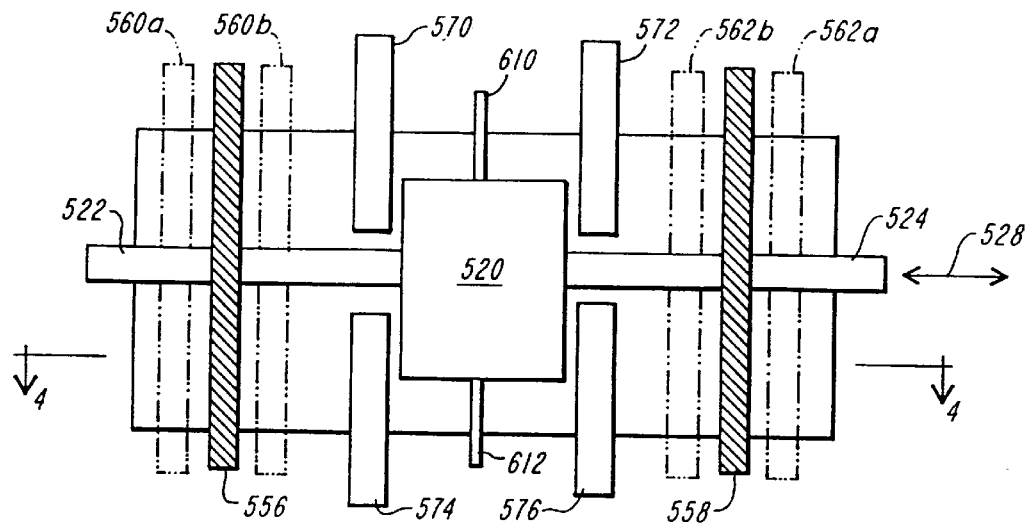
FIG. 3 is a top view of a schematic representation of an alternative embodiment of the micromechanical vibrating beam accelerometer of FIG. 1.
Figure 4:
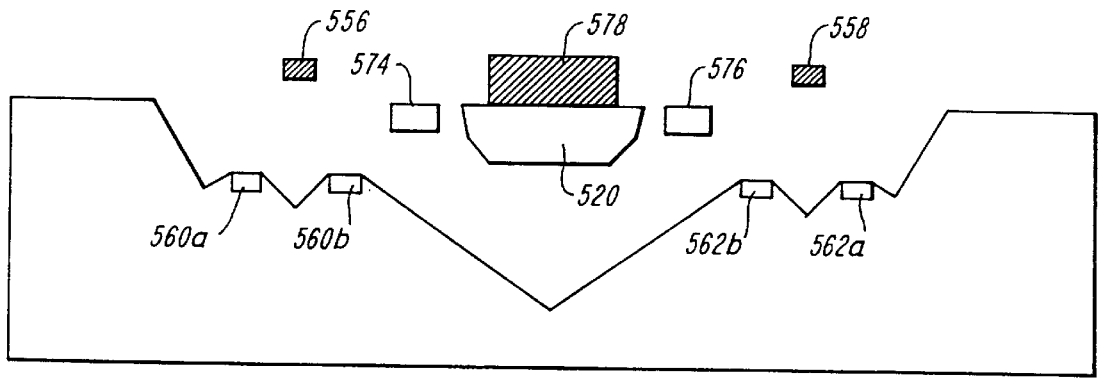
FIG. 4 is a cross-sectional view of the micromechanical vibrating beam accelerometer of FIG. 3 taken along lines 4—4.

In an alternative embodiment of the monolithic micromechanical vibrating beam accelerometer according to the present invention, illustrated in FIGS. 3 and 4, the electronics of the accelerometer can be configured to eliminate the need to electrically isolate the proof mass 520 and the proof mass counterweight 578 from resonant, flexible elements 522, 524. Thus, the lap joints 26 of FIGS. 1 and 2 are omitted from this embodiment. The configuration of FIGS. 3 and 4 further involves minimization of parasitic capacitance by use of bridge sense electrodes 556, 558 and diode isolated, buried complimentary drive electrodes 560a, 560b, 562a, 562b. Sense electrode 556, 558 dielectric isolation is provided by a protective oxide coating which remains on the surface of the accelerometer substrate 12 after device fabrication, as described in below.

Though the accelerometer embodiment of FIGS. 1 and 2 have single drive electrodes 60, 62, an alternative accelerometer configuration employs buried sense electrodes 556, 558 and complimentary bridge drive electrodes 560a, 560b, 562a, 562b (not illustrated). The use of complimentary drive electrodes 560a, 560b, 562a, 562b minimizes the opportunity for electrical feedthrough between the drive electrodes (560a, 560b, 562a, 562b and the sense electrodes 556, 558.

A further embodiment of the vibrating beam accelerometer embodiment of FIG. 1 includes rebalance electrodes 570, 572, 574, 576, as in FIGS. 3 and 4. These electrodes 570, 572, 574, 576 selectively impart force on the proof mass 520 and can be used to trim the resonant frequency of the associated flexible element 522, 524 electrically, or without the need to physically trim the flexible element 522, 524 resonant frequencies, resulting in a more sensitive device having a larger dynamic range. Further, the rebalance electrodes 570, 572, 574, 576 are used to implement a self test function, imparting a known force on the proof mass 520 and enabling the comparison of a measured device output with an expected device output.

Also illustrated in FIG. 3 are stabilizing beams 610, 612 which are used in one embodiment of the vibrating beam accelerometer. These stabilizing beams 610, 612 provide low resistance to force delivered along an acceleration sensitive axis 528, allowing free proof mass 520 motion along that axis 528, while providing resistance to proof mass 520 motion in any direction orthogonal to this axis 528.

Again with reference to FIGS. 1 and 2, one end of each of flexible elements 22 and 24 is attached to opposite sides of proof mass 20 and generally collinear with an acceleration sensitive axis 28. In the preferred embodiment, the second end of each of the flexible elements is attached to tension relief beams 30 and 32. Although first and second tension relief beams are shown in the preferred embodiment, only one tension relief beam is required to trim the resonant frequencies of both the first and second flexible elements and provide a structure to accommodate stress and strain. The initial tension on flexible elements 22 and 24 is controlled by tension relief beams 30 and 32 which may be physically trimmed after the accelerometer has been fabricated to obtain a desired resonant frequency in flexible elements 22 and 24.

The boron diffusion used in one of the methods disclosed herein for defining the vibrating beam accelerometer and the subsequent etching of the surrounding silicon can cause shrinking that creates a high tensile force in the flexures. Tension relief beams 30 and 32 formed by openings 36 and 38 and supports 40 and 42 serve to relieve the stress by allowing the tension relief beams to deflect or bow slightly, thereby reducing the torsional stiffness of flexible elements 22 and 24 and serving to lower the resonant frequency of the flexible elements. Tension relief beams and a method for trimming the resonant frequency of a structure employing tension relief beams are described in greater detail in Applicant's U.S. Pat. No. 5,144,184 entitled "Micromechanical Device with a Trimmable Resonant Frequency Structure and Method of Trimming Same" incorporated herein by reference.

Support structures 40 and 42 further include removable regions 44 which have a thickness less than the thickness of the surrounding support structures 40 and 42. Providing areas of reduced thickness 44 facilitates enlargement of openings 36 and 38 as shown at 46, thereby further reducing the tension on tension relief beams 30 and 32 for trimming the resonant frequency of flexures 22 and 24 after the micromechanical vibrating beam accelerometer has been fabricated. Trimming of the resonant frequency as shown at location 46 may be performed, for example, by utilizing a source of high intensity radiant energy such as a lasing tip to remove some of the area of reduced thickness 44. Support structures 40 and 42 are electrically isolated from silicon substrate 12 by means such as dielectric lap joints 48 and 50. Alternatively, support structures 40 and 42 may be isolated by means of a PN junction at regions 48 and 50.

Platform 18 of proof mass 20 is supported by proof mass support elements 52 and 54 which are mechanically connected to the proof mass support platform and may be electrically isolated from the substrate. Like the tension relief elements, the mass support elements 52 and 54 are thin silicon ribbons having a high height-to-width ratio of typically 10-to-1. For example, mass support elements measuring 1 micron wide×10 microns high support the proof mass and prevent it from sagging while allowing the proof mass to move along the acceleration sensitive axis 28 with little opposition from the elements 52 and 54.

To operate the micromechanical vibrating beam accelerometer of the present invention, flexible elements 22 and 24 are driven in a self-resonant mode by drive electronics such as buried drive electrodes 56 and 58 as shown in U.S. Pat. No. 5,016,072, entitled "Semiconductor Chip Gyroscopic Transducer," and sensed by sense electrodes such as bridge sense electrodes 60 and 62 as shown in U.S. Pat. No. 5,216,490, "Bridge Electrodes for Micromechanical Devices." Electrical contact regions 74 and 76 are provided to contact support structures 40 and 42 which are attached to flexible elements 22 and 24. These contact regions contact the support structures through an opening in the dielectric lap joints as shown at 48 and 50. For greater accuracy and noise immunity, the footings of bridge electrodes 60 and 62 may be surrounded by P-type junction isolation regions 64 which may be used in a "driven shield" mode to effectively electrically isolate the bridge electrodes from the surrounding substrate, minimizing parasitic capacitance and resulting in lower noise and increased accuracy.

The monolithic micromechanical vibrating beam accelerometer of the present invention uses on-chip drive electronics 68 and sense electronics 66 and 67 (through vias 48, 50 and contacts 74, 76) to provide the drive and sense signals to the bridge, buried, and resonant structure electrodes. At minimum, the drive and sense electronics include a number of buffers and amplifiers. Such electronics are described in greater detail in Applicant's copending U.S. patent application Ser. No. 07/904,211 entitled "Monolithic Micromechanical Accelerometer" incorporated herein by reference. Additional on-chip circuitry includes heater electronics 70 which typically comprises a resistive element disposed in at least a portion of the substrate 14. Temperature sensing electronics 72 including a diode as well as other components, are coupled to heater electronics 70. The heater and temperature sensor insure that the accelerometer temperature is maintained at +/−0.01° C. to achieve measurement accuracy on the order of 1 ppm bias stability.

The monolithic micromechanical vibrating beam accelerometer is shown in cross-section in FIG. 2 including etched pit 14 having sloped walls 16, over which is suspended vibrating beam accelerometer platform 18. Proof mass 20 includes a mass of silicon approximately 400 microns long× 400 microns wide×50 microns deep, upon which is plated a gold counterweight 78 approximately 400 microns long× 400 microns wide×17.7 microns high. This provides the accelerometer with a center of gravity at point 80 and a sensitivity of approximately 4000 Hz/g.

Proof mass 20 is generally equally supported by flexible elements 22 and 24. The flexible elements are thin ribbons of silicon typically 0.5 microns thick×20 microns wide×200 microns long, with a resonant frequency of approximately 90 kHz.

Proof mass 20 is fabricated by anisotropically etching a region 82 through a surface oxide layer to form the center of what is to become a silicon "tub" that holds the silicon portion of proof mass 20. The sidewalls and bottom of the tub for the proof mass 20 are then diffused with Boron as shown at 86 to form an etch stop for the subsequent etching process. The silicon "tub" is then backfilled by growing silicon over the Boron diffusion and capping the grown silicon region with a shallow Boron diffusion 88. The remainder of the proof mass platform 18 and the adjacent structural regions 40, 42 and 90, 92 also receive an etch resistant boron diffusion, leaving undiffused strips that will provide insulation under the lap joints 26. Prior to undercutting by the etching process which will mechanically isolate the accelerometer, the proof mass platform 18 is electrically isolated from the flexible elements 22 and 24 by depositing and patterning thick silicon nitride layers 26 which form a dielectric lap joint between the proof mass and the adjacent supporting structure 92. Similarly, dielectric electrically isolated lap joints 94 and 96 are formed and provided over gaps in the diffusion between the regions 40, 42 and the substrate.

Flexible elements 22 and 24 are formed by a separate shallow boron diffusion, typically having a post etch thickness of 0.5 to 1.0 microns. Each of the flexible elements have a first end attached to opposite sides of proof mass 20, while a second end is attached to tension relief elements 30 and 32. In the absence of acceleration, flexible elements 22 and 24 will have a natural resonant frequency. Acceleration along acceleration sensitive axis 28 will result in a small movement of the proof mass 20 which will increase the tension in one flexible element and reduce the tension in the other flexible element. This change in tension in the flexible elements will result in a differential frequency shift between the flexible elements which is proportional to the acceleration-causing the frequency shift.

Tension relief elements 30 and 32 are formed by openings 36 and 38 when boron was not diffused in support structures 40 and 42. Support structures 40 and 42 are also fabricated by a boron diffusion process prior to etching and undercutting. Nitride lap joint regions 94 and 96 electrically isolate the support structures and the flexible elements from silicon substrate 12. Alternatively, PN junctions may be used, extending regions 40, 42 into substrate 12 through a PN junction of a polarity to be back biased in use.

Figure 5:
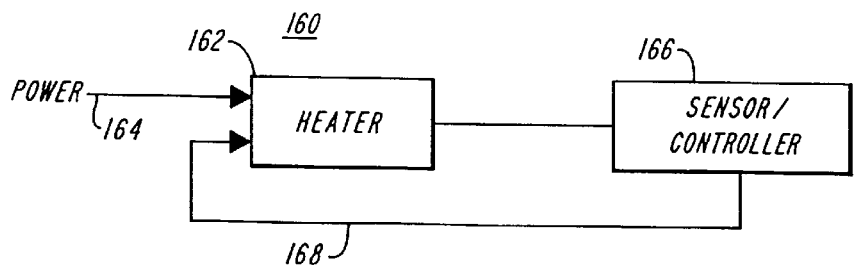
FIG. 5 is a block diagram illustrating heater electronics employed in the present invention.

Flexible elements 22 and 24 are driven in a self-resonant mode and their vibration frequency sensed by means of respective paired buried electrodes 56 and 58 and bridge electrodes 60 and 62, respectively. Accelerometer and substrate heater and sensor/controller electronics are represented in block diagram 160, FIG. 5, wherein a heater 162 connected to a power source 164 is operative for maintaining a constant temperature of the substrate under control of sensor/controller 166 and sensor feedback signal path 168. On-chip circuitry which senses, heats and controls temperature are commercially available and well known to those skilled in the art.

Figure 6A:
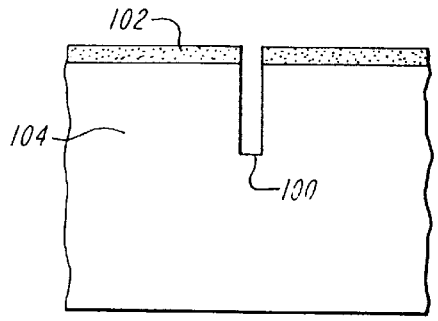
FIGS. 6A–6D illustrate the method of fabricating the tension relief and mass support beams of the present invention.

A feature of the monolithic, micromechanical vibrating beam accelerometer of the instant invention is the ability to provide high aspect ratio tension relief elements and proof mass support elements. As illustrated in the embodiment shown in FIGS. 6A–6D, a method for fabricating such elements includes etching a slit or cut 100, FIG. 6A, through an oxidized layer 102 covering substrate 104 via plasma etching or anisotropic etching. A Boron diffusion 106, FIG. 6B is then applied through etched slit 100.

Figure 6B:
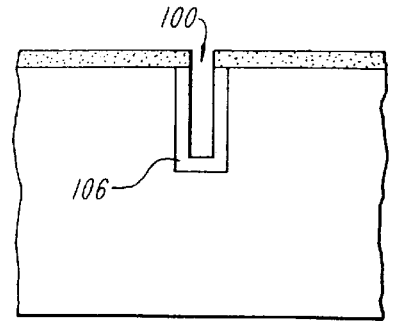
Figure 6C:
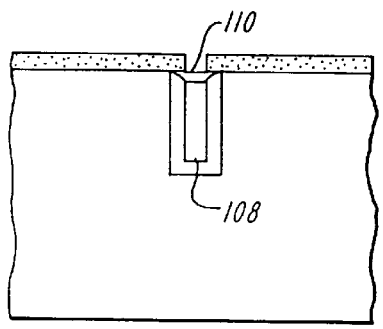
Figure 6D:
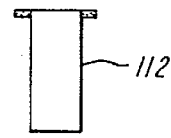

Slit 100 is then backfilled with silicon 108, FIG. 6C, by epitaxially growing silicon in the slit, and capping the silicon with a shallow diffusion 110. After anisotropic etching and undercutting of the structure, a high aspect ratio beam 112 remains. This method may be utilized to fabricate both tension relief and mass support elements. Alternatively, the slit may be left unfilled and a high aspect ratio "U" shaped box like structure will remain after etching to provide the support structure.

Figure 7A:
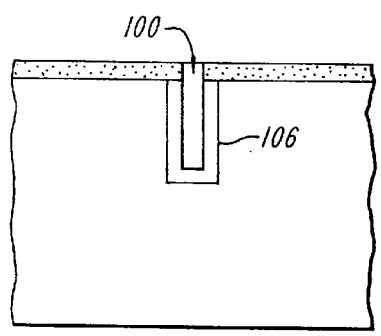
FIGS. 7A–7C illustrate an alternative method for fabricating tension relief and mass support beams of this invention.
Figure 7B:
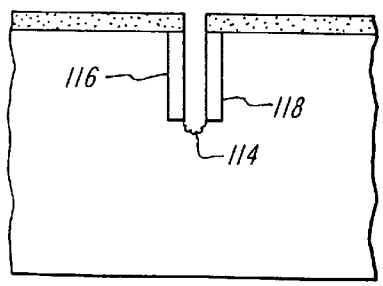
Figure 7C:
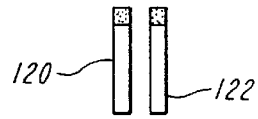

In an alternative embodiment illustrated in FIGS. 7A–7C, slit 100 is Boron diffused 106 as previously illustrated in FIG. 6B. In contrast to step 6C, however, the structure of FIG. 7B is again plasma etched to remove the bottom portion 114 of Boron diffusion 106, leaving side diffusions 116 and 118 intact. After anisotropic etching and undercutting, dual parallel support elements 120 and 122 remain. This technique may yield two parallel elements with aspect ratios of 10 or more and widths as low as 0.1 microns.

Figure 8A:
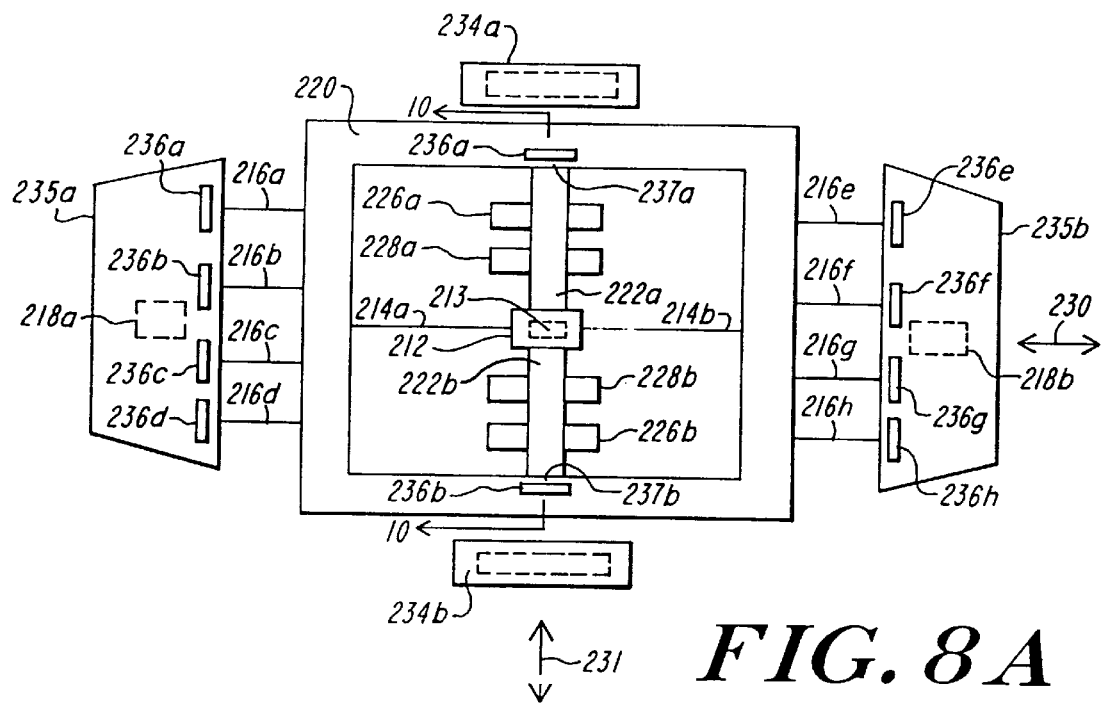
FIG. 8A is a top, schematic representation of an alternative embodiment of the micromechanical vibrating beam accelerometer according to the present invention.

An alternative embodiment of a monolithic, micromechanical vibrating beam accelerometer, illustrated in FIG. 8A, is formed about a central anchor 212, as shown. The anchor portion 212 is disposed upon a base portion 213, shown in phantom, the base portion 213 being disposed on the substrate. Suspended about the central anchor 212 is a peripheral proof mass 220 which, though illustrated in FIG. 8A as having a generally square projection, may be formed in other geometric configurations.

Disposed between the peripheral proof mass 220 and opposing sides of the central anchor 212 are coaxial flexible elements 222a, 222b of generally equivalent dimensions. The flexible elements 222a, 222b are thin silicon ribbons having a high width-to-height ratio, typically on the order of 100-to-1. Typical dimensions for the flexible elements 222a, 222b are 100 microns in width and 1 micron in height.

Figure 8B:
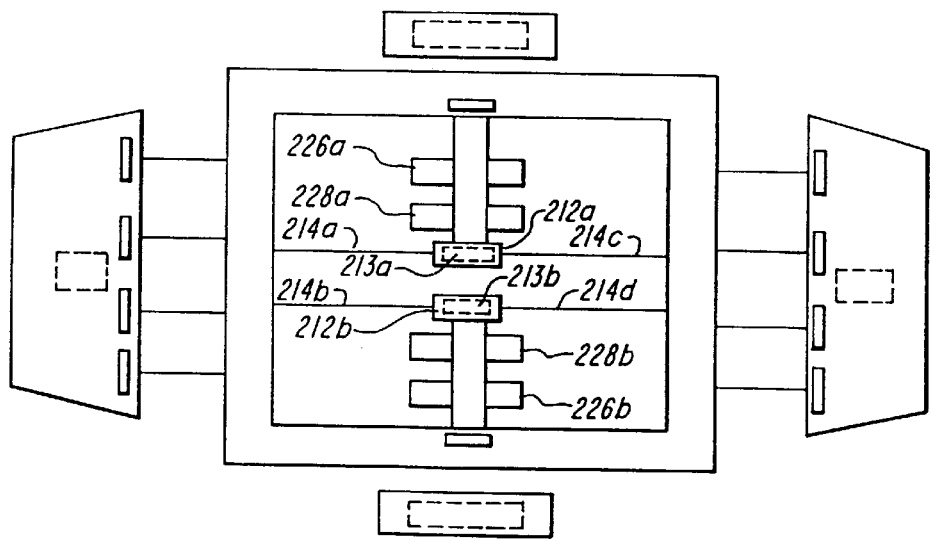
FIG. 8B illustrates an alternative embodiment of the micromechanical vibrating beam accelerometer of FIG. 8A.

The benefit of employing a single central anchor 212 as illustrated in FIG. 8A is to minimize thermal mismatch between flexible elements 222a, 222b. An alternative embodiment of the accelerometer of FIG. 8A employs two central anchors 212a, 212b, as illustrated in FIG. 8B, each disposed on a base portion 213a, 213b, shown in phantom. Each respective base portion 213a, 213b is disposed on the substrate. Mechanical decoupling of the two flexible elements 222a, 222b is the principle benefit achieved using two anchors 212a, 212b.

Again with reference to FIG. 8A, supported upon the substrate beneath each of the two flexible elements 222a, 222b is a drive electrode 226a, 226b and a sense electrode 228a, 228b. The flexible elements 222a, 222b are driven in a self-resonant mode by the drive electrodes 226a, 226b, and sensed by the sense electrodes 228a, 228b. Drive and sense electronics similar to that described in conjunction with the accelerometer of FIG. 1 are associated with the present embodiment, as are heater electronics and temperature sensing electronics.

Figure 8C:
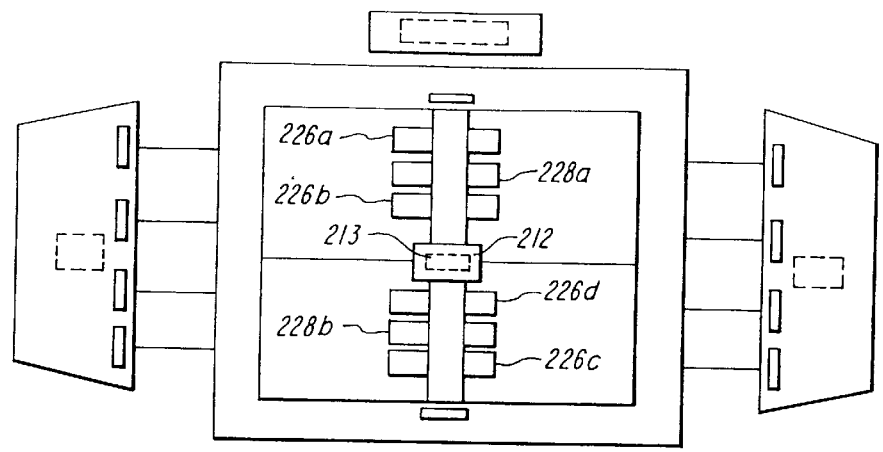
FIG. 8C illustrates a further alternative embodiment of the micromechanical vibrating beam accelerometer of FIG. 8A.

As noted above with respect to FIGS. 1 and 2, each drive electrode 226a, 226b can consist of two complimentary drive electrodes. The accelerometer embodiment of FIG. 8A having such complimentary drive electrodes 226a, 226b, 226c, 226d is illustrated in FIG. 8C. In this embodiment, the drive electrodes 226a, 226c furthest from the central anchor 212 are of the same polarity, while the drive electrodes 226b, 226c proximate the central anchor 212 are of the opposite polarity.

Referring again to FIG. 8A, extending between the central anchor 212 and the peripheral proof mass 220 are typically a plurality of inner support elements 214a, 214b. The peripheral proof mass is also typically supported by a plurality of outer support elements 216a–h extending between the peripheral proof mass 220 and support beams 235a, 235b which are each anchored to the substrate by respective outer anchors 218a, 218b (shown in phantom). Like the mass support elements 52, 54 of FIG. 1, the inner and outer support elements 214, 216 are thin silicon elements having a high height-to-width ratio. Outer support elements 216 are all generally parallel to an axis 230 orthogonal to the flexible elements 222a, 222b.

Support beams 235a, 235b are relatively massive and inflexible. Strain relief for the support elements 216a–h is provided by means of slots 236a–h formed in the support beams 235a, 235b. The purpose of the strain relief is to relieve any excessive stress that may be caused during processing or assembly of the accelerometer.

One principal advantage of the use of at least one centrally located anchor 212 in the present embodiment is that stress induced in the flexible elements 222a, 222b as a result of heavy boron doping during fabrication (discussed hereinafter) can be fully relieved by similar contraction of the accelerometer structure in the direction of the flexible members 222a, 222b. Optional strain relief elements 237a, 237b may be formed in the proof mass 220 by strain relief slits 239a, 239b to provide additional relief along an acceleration sensitive input axis 231 from excess stress generated during processing. These strain relief elements 237a, 237b are stiff enough, however, to transmit almost the entire externally generated acceleration stress to the flexible elements 222a, 222b along the input axis 231.

A second principal advantage of employing at least one centrally located anchor 212 is that the accelerometer is effectively decoupled from strains induced by mechanical bending or thermal stress in the substrate. This is of considerable practical importance as the accelerometer is sensitive to small stresses. Though the outer support beams 235a, 235b are anchored to outer anchors 218a, 218b which are necessarily subject to stress in the substrate, the inner and outer support elements 214, 216 resist stress along the axis 230 orthogonal to the flexible elements 222a, 222b. Additionally, any stress applied along the flexible elements 222a, 222b is applied in a direction in which-the inner and outer support elements 214, 216 bend easily. Thus, substrate stress is not easily applied through the inner and outer support elements 214, 216 to the flexible elements 222.

A third advantage of employing one central anchor 212 is that it allows the entire structure to be supported on only three anchor points, the central anchor 212 and the two support beam anchors 218a, 218b. These anchor points are thermally symmetric with respect to the flexible elements 222a, 222b and thus provide common mode rejection of thermal noise. Even in the presence of a large thermal gradient in the substrate, the heat flux to the flexible elements 222a, 222b is symmetric and the flexible elements 222a, 222b will tend to maintain an identical temperature. As with all semiconductor devices, it is extremely important to enable the maintenance of good bias stability.

Minimized external stress effects are also provided by the use of only three anchors. Specifically, since the three anchors 212, 218a, 218b are aligned orthogonal to the input axis 231, the accelerometer is remains relatively immune to stress gradients along the input axis 231.

In order to operate the accelerometer of FIG. 8A in a closed loop mode, rebalance electrodes 234a, 234b are disposed proximate the peripheral proof mass 220. Either electrostatic or electromagnetic force is applied by the rebalance electrodes 234a, 234b to the peripheral proof mass 220. An associated flexible element 222a, 222b can be effectively trimmed by the use of rebalance electrode 234a, 234b force. The accelerometer can then be operated at very high sensitivity without cross-over of the resonant frequencies of the respective flexible elements 222a, 222b. It is also then possible to achieve a higher degree of thermal compensation by operating the elements at a fixed frequency differential.

Rebalance electrodes 234a, 234b further enable device self test. External control (not illustrated) is employed to tightly control voltage applied to the rebalance electrodes 234a, 234b. An expected response is then compared to the actual output of the accelerometer device under test to generate an indication of device performance characteristics.

Figure 9A:
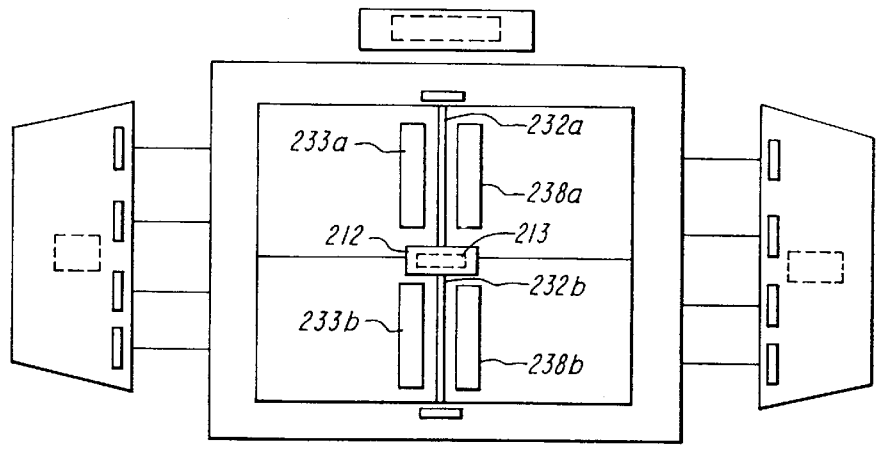
FIG. 9A is a top, schematic representation of a further alternative embodiment of the micromechanical vibrating beam accelerometer according to the present invention.

Another embodiment of a monolithic, micromechanical vibrating beam accelerometer is illustrated in FIG. 9A. The principal difference between this embodiment and that of FIG. 8A is the orientation of the flexible elements 232a, 232b, the drive electrodes 233a, 233b, and the sense electrodes 238a, 238b. All other elements are as illustrated in FIG. 8A. Specifically, the flexible elements 232a, 232b in FIG. 9A have a high height-to-width ratio. As a result, the drive electrodes 233a, 233b and the sense electrodes 238a, 238b are disposed generally parallel to and on opposing sides of the flexible elements 232. Rather than eliciting vibrations in a direction generally orthogonal to a plane defined by the peripheral proof mass 220 as in the accelerometer of FIG. 8A, vibrations in the accelerometer of FIG. 9A occur in the plane of the proof mass 220 and between the opposing drive electrodes 233a, 233b and sense electrodes 238a, 238b, respectively. It is still responsive to the same inertial input axis 231.

Although this configuration has a lower readout capacitance than that of FIG. 8A due to a lower flexible beam 232a, 232b surface area presented to the drive 233a, 233b and sense 238a, 238b electrodes, the mechanical Q of the present embodiment is much higher than that of the embodiment of FIG. 8A because only sideways versus squeeze film damping is encountered. Depending on the application this could be advantageous.

Figure 9B:
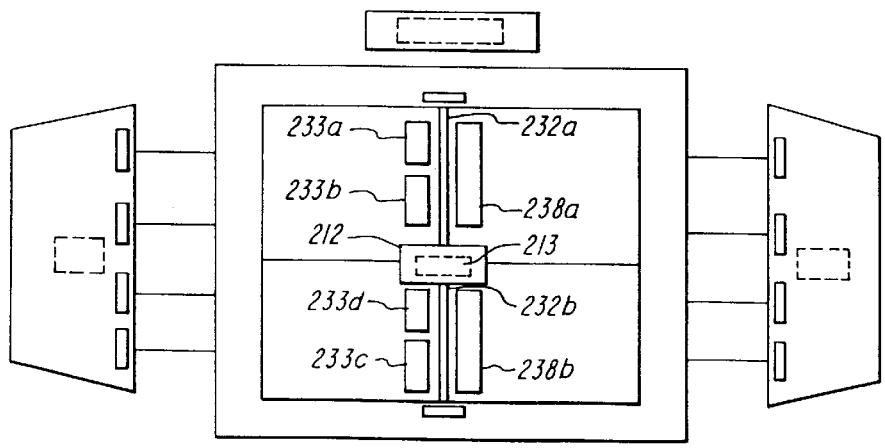
FIG. 9B illustrates an alternative embodiment of the micromechanical vibrating beam accelerometer of FIG. 9A.

As previously discussed, each drive electrode 226a, 226b can consist of complimentary positive and negative drive electrodes 226a, 226b, 226c, 226d. As illustrated in FIG. 9B, drive electrodes 226a, 226c furthest from the central anchor 212 have the same polarity, while drive electrodes 226b, 226d closest to the central anchor have the opposite polarity.

Figure 10:
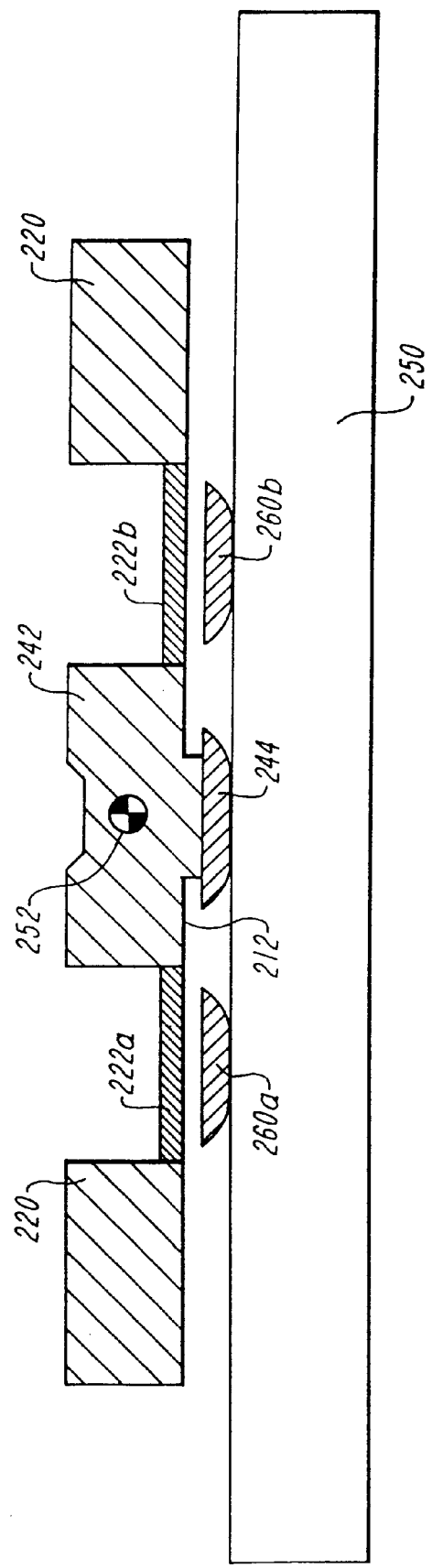
FIG. 10 is a cross-sectional view of the micromechanical vibrating beam accelerometer of FIG. 8A taken along lines 10—10.

With reference to FIG. 10, a cross-sectional view of the accelerometer of FIG. 8A is illustrated in which one central anchor 212 is employed. The central anchor 212 comprises an anchor body 242 and a base portion 244. While not illustrated in FIG. 10, the outer anchors 218a, 218b similarly comprise an anchor body and a base portion as described. As discussed above, the use of one base portion 244 for the central anchor 212 further enhances the mechanical decoupling effect between a substrate 250 and the accelerometer, although two can be used for enhanced mechanical decoupling between the two flexible elements 222a, 222b. Formed in a similar fashion to the anchor base portion 244 are electrodes 260a, 260b. These can be either drive or sense electrodes as described with respect to FIG. 8A.

In the embodiment of the accelerometer illustrated in FIG. 10, the flexible elements 222a, 222b are formed by a second boron diffusion during device fabrication, described in further detail with respect to FIGS. 11A–11F. This produces flexible elements 222a, 222b which lie below a center of gravity 252 of the peripheral proof mass 220. This is not a particularly desirable feature. However, the high aspect ratio support elements 214, 216 illustrated in FIG. 8A make the structure very stiff with respect to out of plane motion. This tends to cancel any negative effects on the flexible elements 222a, 222b.

Figure 11A:
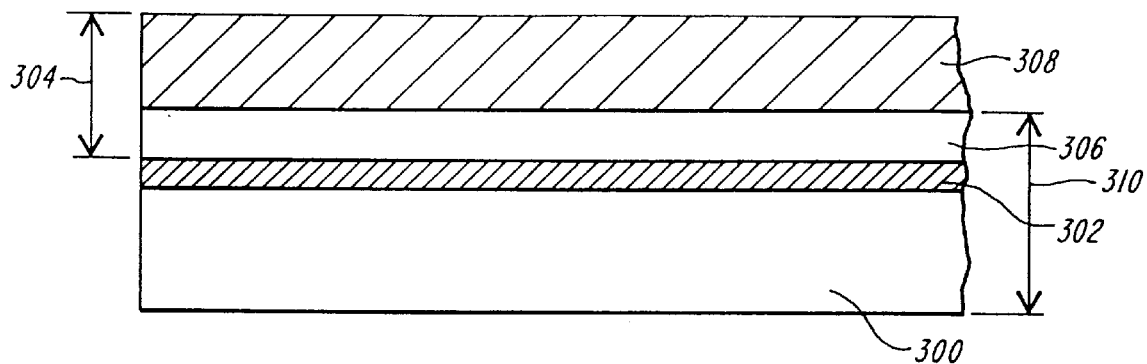
FIG. 11A illustrates a representative cross-sectional view of fabrication of the micromechanical vibrating beam accelerometer of FIG. 10 according to a two epitaxial layer dissolved silicon process.

A first method for fabricating micromechanical devices such as gyroscopes and accelerometers, including the vibrating beam accelerometer embodiments as disclosed herein, is a two epitaxial layer dissolved silicon process. Referring to FIGS. 11A–11F, fabrication of the monolithic, micromechanical vibrating beam accelerometer of FIG. 8A begins with an N-type silicon substrate 300, referred to as a "handle," having a first oxidized surface 302. The handle 300 is typically, though not necessarily, on the order of 500 microns in thickness. A second silicon wafer 304 having a thin N layer 306 and a larger P layer 308 is wafer bonded to the oxidized surface 302 of the handle 300. The exposed P layer 308 is then removed by electrochemical etching, resulting in a starting wafer 310 as shown in FIG. 11A. Substrates of this type are commercially available and are known as SOI (silicon-on-insulator) wafers. It is intended, but not necessary, that commercially available SOI wafers be used as input to the fabrication process.

Figure 12:
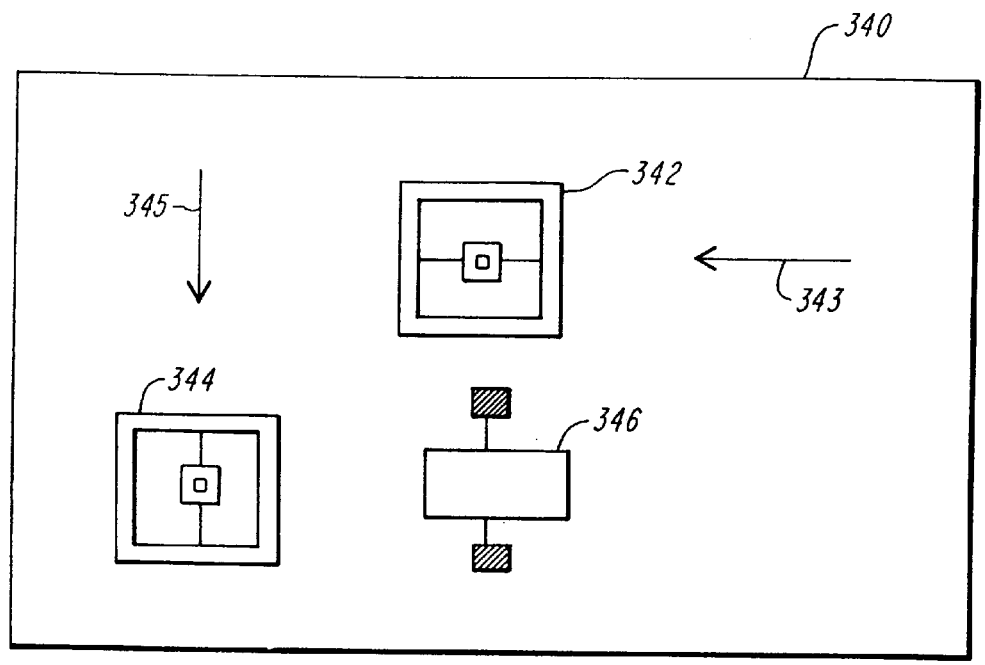
FIG. 12 illustrates a top view of a triad of accelerometers responsive to three orthogonal input axes fabricated according to the methods disclosed herein.

This type of starting wafer 310 is generic to many different micromechanical devices, thus facilitating the fabrication of varied devices on one starting wafer 310. This can be used to advantage in several ways:

First, it is possible to fabricate more than one instrument at a time by this process. The vibrating beam accelerometer has its input axis in the plane of the wafer. Previous seesaw type accelerometers have been built with an input axis normal to the wafer. Thus, as illustrated in FIG. 12, it becomes practical to build an entire orthogonal accelerometer triad 340 on a single substrate using, for example, two vibrating beam accelerometers 342, 344 and one see-saw type accelerometer 346. First vibrating beam accelerometer 342 is sensitive to acceleration along a first axis 343, second vibrating beam accelerometer 344 is sensitive to acceleration along a second orthogonal axis 345, and the see-saw type accelerometer 346 is sensitive to acceleration orthogonal to the plane of the substrate.

Figure 13:
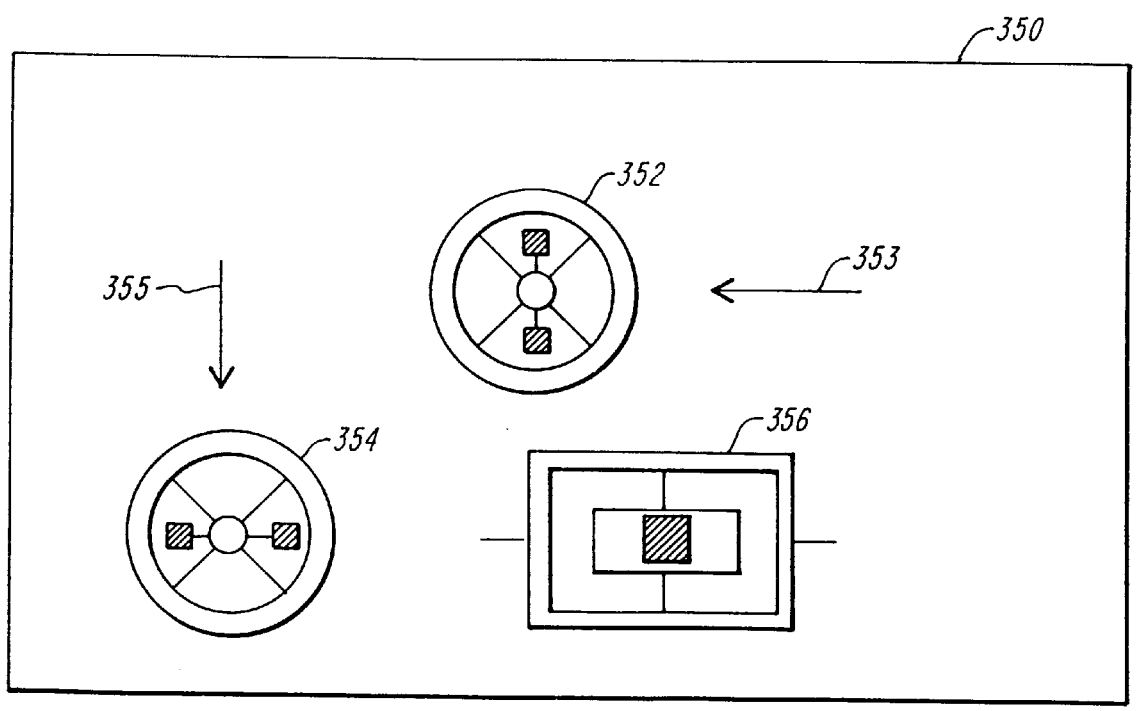
FIG. 13 illustrates a top view of a triad of gyroscopes responsive to three orthogonal inertial axes fabricated according to the methods disclosed herein.

Furthermore, micromechanical gyroscopes can also be built with input axes in and orthogonal to the plane of the substrate, making an entire IMU (Inertial Measurement Unit) on a single chip a possibility. FIG. 13 illustrates a possible triad 350 configuration of gyros, including two vibrating wheel gyros 352, 354 having orthogonal inertial input axes 353, 355 and one double gymbal gyro 356 responsive to inertial input along an axis orthogonal to the substrate.

Second, the starting wafer may be shipped to a foundry for incorporation of electronic devices prior to or after inertial instrument fabrication. Clearly, this is feasible although the instrument fabrication needs some modification to do this.

While the first surface 302 of the N-type silicon substrate 300 of FIG. 11A has been described as being of silicon oxide, it is also possible to use a silicon nitride layer, preferably silicon rich, to form a dielectric layer having a superior thermal expansion match within the layers of the starting wafer 310. This is particularly important when larger wafers are required since any thermal discontinuity would be exaggerated.

Figure 11B:
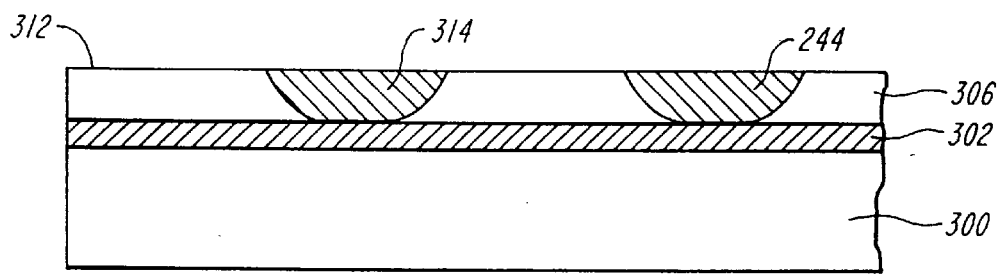
FIG. 11B illustrates a further step of the fabrication begun in FIG. 11A.

With reference to FIG. 11B, a fabrication process will be described which relies on high concentration boron doping as an anisotropic etch stop. EDP (ethylene-diamine-pyrocatechol-water) is one example of an etchant employed. A now exposed surface 312 of the thin N layer 306 is oxidized and photolithographically patterned to enable selective boron diffusion into the thin N layer 306. The diffusion goes completely through the N layer 306 and results in a high boron concentration at the oxide interface. Specifically, a boron diffusion will form an electrode 314, such as a drive electrode 226 or a sense electrode 228. The boron diffusion will also form the base portion 244 of the central anchor 212.

Figure 11C:
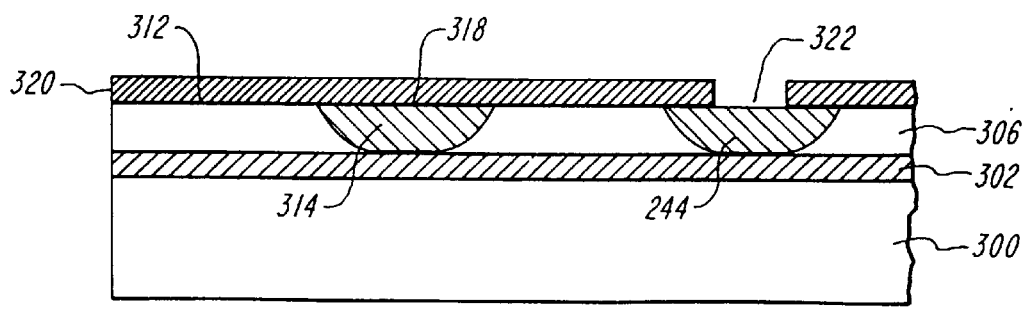
FIG. 11C illustrates a further step of the fabrication begun in FIG. 11A.

As illustrated in FIG. 11C, an N type lightly doped first epitaxial layer 320 is deposited on the exposed surface 312 of the thin N layer 306 to a desired thickness. In the completed accelerometer of FIGS. 8A, 8B, 8C, 9A and 9B, the thickness of the N type epitaxial layer is equal to an electrode gap between the flexible element 222 and either the drive or sense electrodes 226, 228. A nominal electrode gap thickness for this process is one micron. The N type epitaxial layer 320 is then etched to form at least one via 322, exposing a segment of the base portion 244 of the central anchor 212 and of all outer anchors 218 (not shown). Since electrode gaps for multiple devices located on the same wafer are created simultaneously by deposition of one epitaxial layer 320, enhanced uniformity of gap thickness is achieved.

Figure 11D:
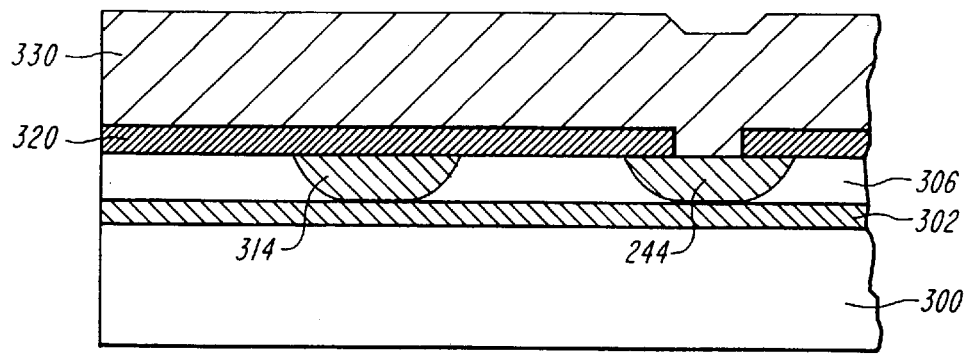
FIG. 11D illustrates a further step of the fabrication begun in FIG. 11A.

Once vias 322 are etched through the N type epitaxial layer 320, a heavily boron (P+) doped epitaxial layer 330 is deposited to a thickness desired for the peripheral proof mass 220, as in FIG. 11D. In order to minimize stress inherent in silicon having a high boron concentration, which can cause geometric and thermal distortion, it is preferable to include germanium at a concentration roughly equivalent to the boron concentration. Further, by epitaxially depositing boron and germanium doped layers rather than diffusing boron and germanium, the P+ epitaxial layer 330 is free from concentration gradients which cause curling of the layer. P+ epitaxial layer 330 thickness is also subject to much greater control in comparison to a diffusion method, in which a P type material is heavily doped into an existing silicon layer.

Figure 11E:
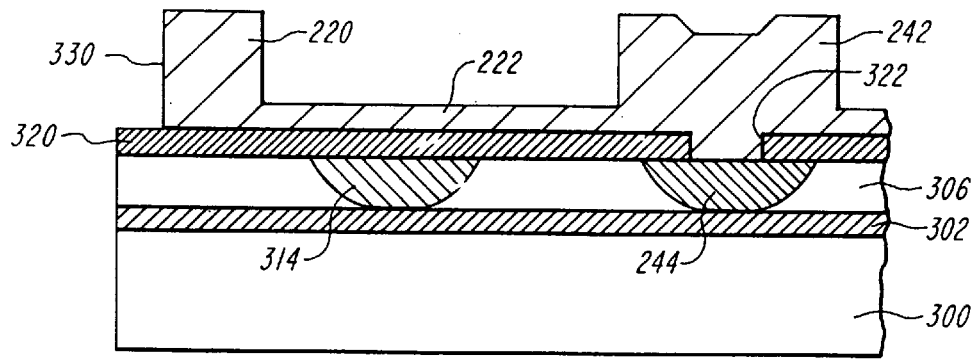
FIG. 11E illustrates a further step of the fabrication begun in FIG. 11A.

The P+ doped epitaxial layer 330 is used to form the majority of the suspended part of the accelerometer of FIGS. 8A, 8B, 8C, 9A, 9B and 10. The P+ doped epitaxial layer 330 is masked in a manner known in the art, such as by photoresist and/or metal mask, and patterned using reactive ion etching (RIE). Thus, as shown in FIG. 11E, the peripheral proof mass 220, flexible elements 222, and anchor body 242 are formed, and the anchor body 242 is bonded to the anchor base 244 through the via 322. To form low aspect ratio parts such as a ribbon flexible element 222, a separate RIE step is required.

An advantage of this process is that formation of the proof mass 220 and flexible elements 222 with respect to the already formed electrodes 314 occurs under ideal alignment conditions, resulting in highly accurate alignment. This is in contrast to methods involving anodic bonding of a device formed of a silicon wafer and an insulating substrate such as glass.

It is at this stage that metallization for interconnects is deposited and patterned. TiW, Pd, and Au are suitable sequential materials for these purposes. The areas where wire bonding is to take place are built up in a fashion similar to the via and proof mass so that metallization takes place on the top surface of the second epitaxial layer 330 prior to anisotropic etch.

Figure 11F:
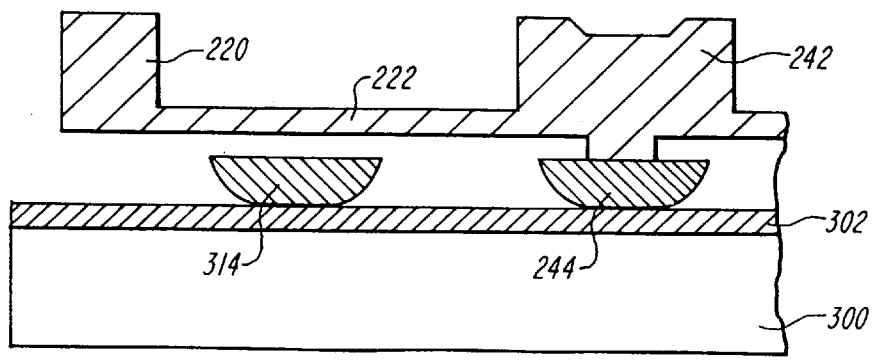
FIG. 11F illustrates a further step of the fabrication begun in FIG. 11A.

Placing the structure formed as described thus far in an ethylene-diamine-pyrocatechol-water (EDP) bath is the final step in the formation of the accelerometer. The N type material is etched away, leaving behind the heavily boron doped regions and the oxide or nitride first surface 302 on the handle 300, as illustrated in FIG. 11F.

One of the principle advantages of the method described with respect to FIGS. 11A–11F lies in the control one has over the thickness of the N lightly doped first epitaxial layer, and thus over the electrode gap thickness in the finished device(s). This advantage is counterbalanced by the requirement of carrying out two epitaxial depositions.

An analogous process to that just described can be used to fabricate a vibrating beam accelerometer in polysilicon, according to the invention. A virtually identical starting wafer can be used to implement the polysilicon device, as used and described with respect to FIG. 11A. In such a polysilicon process, P+ and N polysilicon are substituted for the single crystal epitaxially grown layers.

Similarly, a polysilicon device can be fabricated using a starting wafer of nitride coated silicon. Again, in such a polysilicon device, P+ and N polysilicon are substituted for the single crystal epitaxially grown layers.

A second method for fabricating micromechanical devices such as gyroscopes and accelerometers, including the vibrating beam accelerometer embodiments as disclosed herein, is a single epitaxial layer dissolved silicon process. Referring to FIGS. 14A–14F, fabrication of the monolithic, micromechanical vibrating beam accelerometer of FIG. 8A begins with the same SOI handle as described with reference to FIGS. 11A and 11B. Specifically, with reference to FIG. 14A, a starting wafer 610 consisting of a P+ type silicon wafer "handle" 600 and an oxide or nitride surface layer 602 is wafer bonded to a thin N-type layer 606 of a wafer 604 consisting the N-type layer 606 and a P-type layer 608. An approximate thickness for the handle layer 600 is 500 microns. The P-type layer 608 is then removed by electrochemical etching. As noted, substrates of this type are commercially available and are known as SOI (silicon-on-insulator) wafers.

The comments made above with respect to fabrication of more than one device on one such starting wafer, as illustrated in FIGS. 12 and 13, are equally applicable to the presently disclosed process.

Figure 14A:
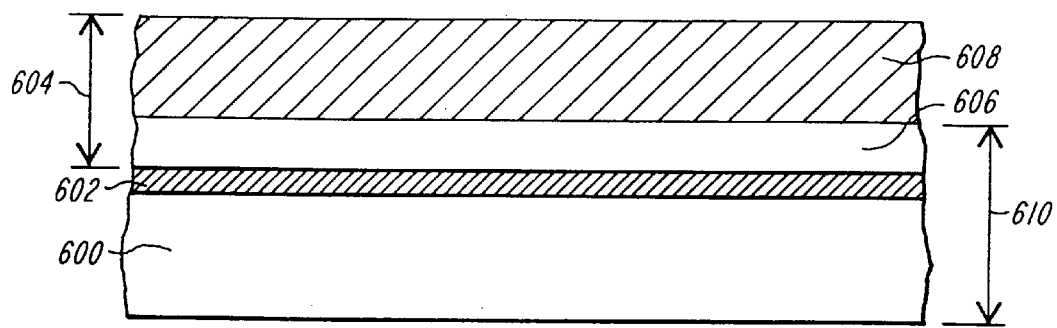
FIG. 14A illustrates a representative cross-sectional view of fabrication of the micromechanical vibrating beam accelerometer of FIG. 10 according to a one epitaxial layer dissolved silicon process.
Figure 14B:
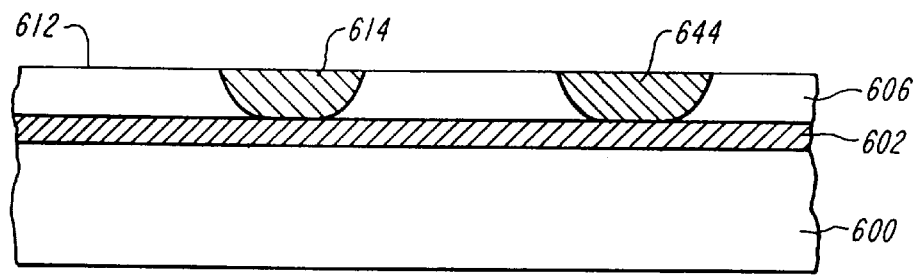
FIG. 14B illustrates a further step of the fabrication begun in FIG. 14A.

With reference to FIG. 14B, a fabrication process will be described which relies on high concentration boron doping as an anisotropic etch stop. EDP (ethylene-diamine-pyrocatechol-water) is one example of an etchant employed. A now exposed surface 612 of the thin N layer 606 is oxidized and photolithographically patterned to enable selective boron diffusion into the thin N layer 606. The diffusion goes completely through the N layer 606 and results in a high boron concentration at the oxide interface. Specifically, a boron diffusion will form an electrode 614, such as a drive electrode 226 or a sense electrode 228. The boron diffusion will also form a base portion 644 of a central anchor 612.

Figure 14C:
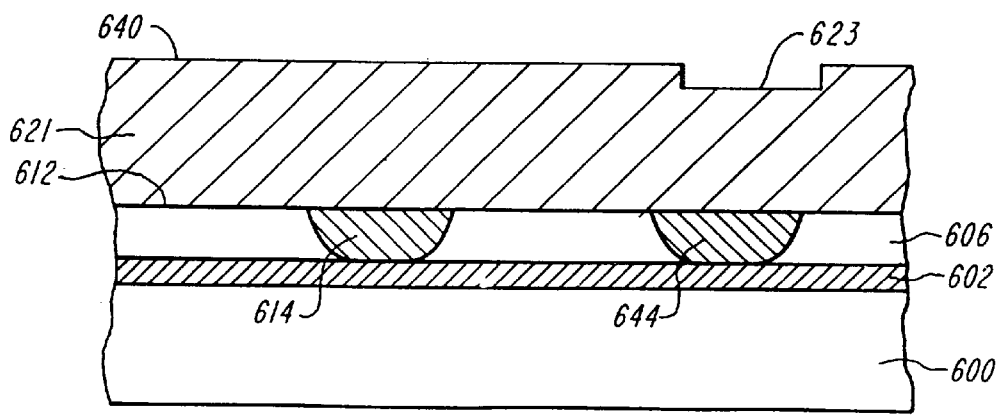
FIG. 14C illustrates a further step of the fabrication begun in FIG. 14A.

As illustrated in FIG. 14C, and in contrast to the two epitaxial layer deposition process of FIGS. 11A–11F, the present process calls for a single N-type epitaxial layer 621 deposition on the exposed surface 612 of the thin N layer 606. With reference to the completed accelerometers of FIGS. 8A, 8B, 8C, 9A and 9B, the thickness of the N type epitaxial layer is equal to an electrode gap between a flexible element 222 and either the drive or sense electrodes 226, 228 plus the thickness of the proof mass 220 suspended thereover. The nominal thickness for this epitaxial layer 621 is 10 microns. The nominal thickness for the resultant electrode gap 650 thickness is between three and six microns.

As shown in FIG. 14C, a pit 623 is etched into an exposed surface 640 of the N type epitaxial layer 621. The depth of the pit 623 is roughly equivalent to the desired electrode gap 650 thickness in the finished device. Each pit 623 is positioned in the surface of the N type epitaxial layer over a respective anchor base portion 644.

Figure 14D:
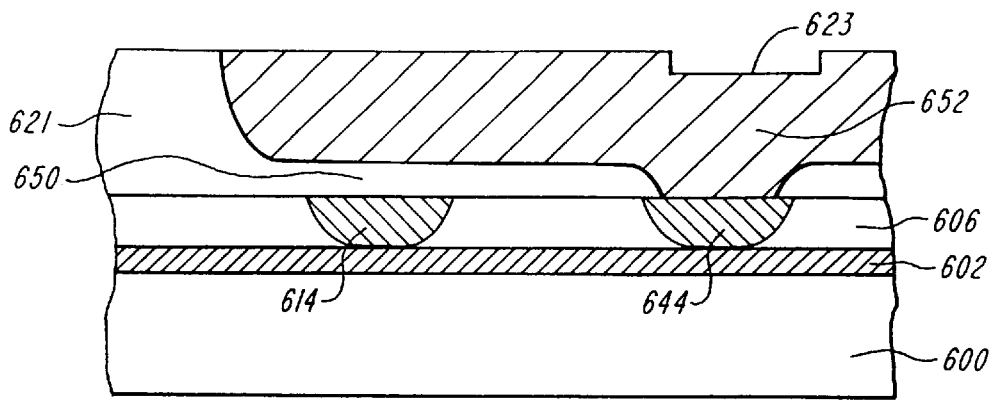
FIG. 14D illustrates a further step of the fabrication begun in FIG. 14A.

The next step, as illustrated in FIG. 14D, includes oxidizing and photolithographically patterning the exposed surface of the epitaxial layer 621 to enable selective boron (P+) diffusion into the epitaxial layer 621 to form a P+ doped device region 652. Where a pit 623 has been etched, the diffusion goes through the epitaxial layer 621 and all the way to the underlying anchor base portion 644. The electrode gap 650 between the P+ doped region 652 and previously doped electrodes 614 is thus defined by the distance between the leading edge of the doped region 652 and a proximate surface of the underlying electrode 614.

Figure 14E:
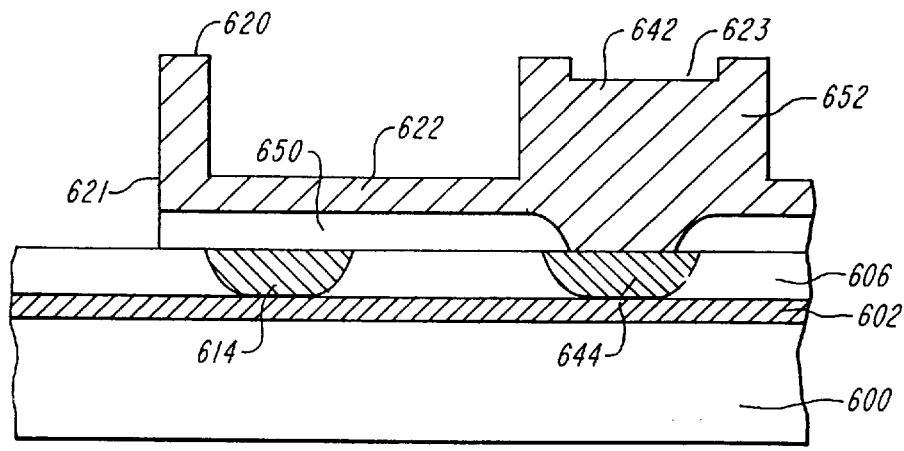
FIG. 14E illustrates a further step of the fabrication begun in FIG. 14A.

The epitaxial layer 621, including the boron doped P+ region 652, is masked in a manner known in the art, such as by photoresist and/or metal mask, and patterned using reactive ion etching (RIE). Thus, as shown in FIG. 14E, the peripheral proof mass 620, flexible elements 622, and anchor body 642 are defined.

An advantage of this process is that only one epitaxial layer 621 deposition is required. Further, formation of the proof mass 620 and flexible elements 622 with respect to the already formed electrodes 614 occurs under ideal conditions, resulting in highly accurate alignment. This is in contrast to methods involving anodic bonding of a device formed of a silicon wafer and an insulating substrate such as glass.

It is at this stage that metallization for interconnects is deposited and patterned. TiW, Pd, and Au are suitable sequential materials for these purposes. The areas where wire bonding is to take place are built up in a fashion similar to the proof mass so that metallization takes place on the top surface of the epitaxial layer 621 prior to anisotropic etch.

Figure 14F:
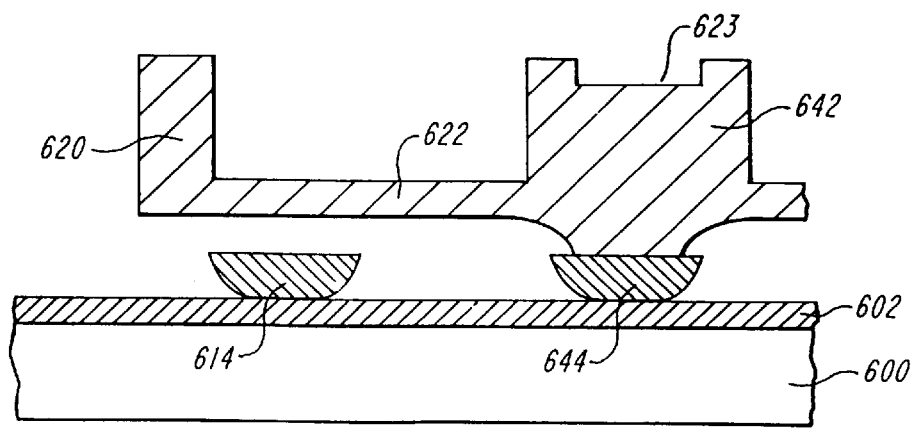
FIG. 14F illustrates a further step of the fabrication begun in FIG. 14A.

Placing the structure formed as described thus far in an ethylene-diamine-pyrocatechol-water (EDP) bath is the final step in the formation of the accelerometer. The undoped N-type material of the epitaxial layer 621 is etched away along with the undoped portions of the thin N layer 606, leaving behind the heavily boron doped regions and the oxide or nitride first surface 602 on the handle 600, as illustrated in FIG. 14F. Note that the representations of the devices in FIGS. 14A through 14F are not to scale, particularly with respect to the width of the proof mass 620, the length of the flexible elements 622, and the width of the anchor body 642.

An analogous process to that just described can be used to fabricate a vibrating beam accelerometer in polysilicon, according to the invention. A virtually identical starting wafer can be used to implement the polysilicon device, as used and described with respect to FIG. 14A. In such a polysilicon process, P+ and N polysilicon are substituted for the single crystal epitaxially grown layer.

Similarly, a polysilicon device can be fabricated using a starting wafer of nitride coated silicon. Again, in such a polysilicon device, P+ and N polysilicon are substituted for the single crystal epitaxially grown layers.

A third method for fabricating micromechanical devices such as gyroscopes and accelerometers, including the vibrating beam accelerometer embodiments as disclosed herein, is a single epitaxial layer electrochemically etched silicon process. Referring to FIGS. 15A–15F, fabrication of the monolithic, micromechanical vibrating beam accelerometer of FIG. 8A begins with a similar SOI handle as described with reference to FIGS. 11A and 11B. However, with reference to FIG. 15A, a starting wafer 710 consisting of an N-type silicon wafer 700 and an oxide or nitride surface layer 702 is wafer bonded to a thin P-type layer 706 of a wafer 704 consisting of the P-type layer 706 and an N-type "handle" layer 708. The N-type layer 708 is then removed by mechanical lapping and polishing or other suitable means. As noted, substrates of this type are commercially available and are known as SOI (silicon-on-insulator) wafers.

The comments made above with respect to fabrication of more than one device on one such starting wafer, as illustrated in FIGS. 12 and 13, are equally applicable to the presently disclosed process.

Figure 15A:
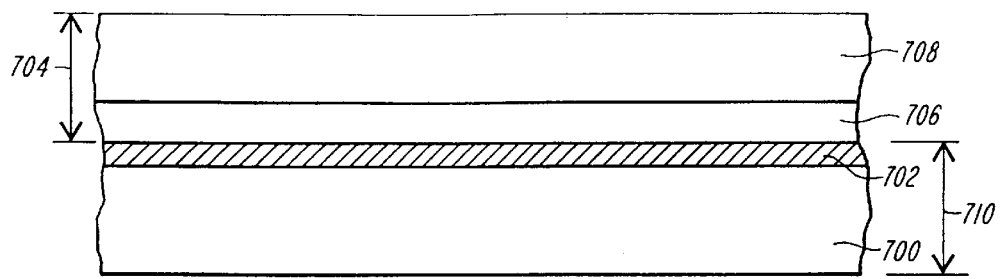
FIG. 15A illustrates a representative cross-sectional view of fabrication of the micromechanical vibrating beam accelerometer of FIG. 10 according to a one epitaxial layer electrochemical process.
Figure 15B:
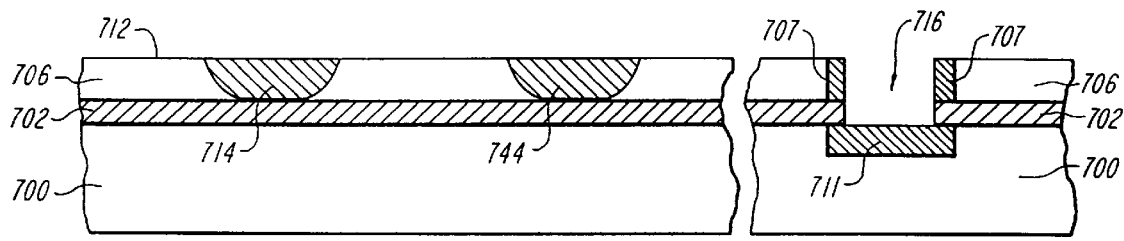
FIG. 15B illustrates a further step of the fabrication begun in FIG. 15A.

With reference to FIG. 15B, a fabrication process will be described which relies on arsenic and phosphorous doping as an electrochemical etch stop. KOH (potassium hydroxide) is one example of an etchant employed. A window is patterned on an exposed surface 712 of the thin P layer 706, and a via is etched through the thin N layer and the oxide or nitride layer 702, exposing the N substrate 700. This forms the basis for a via 716 which will eventually enable electrical interconnection of N-type device elements, described hereinafter, with the N-type substrate 700. The role of this interconnection in electrochemical etching will be discussed.

The exposed surface 712 of the thin P layer 706 is oxidized and photolithographically patterned to enable selective arsenic diffusion into the thin P layer 706 and into the via 716. The diffusion goes completely through the P layer 706, leaving a thin layer of arsenic on walls 707 of the via 716, and results in an arsenic concentration at the oxide interface. The diffusion also goes through the via 716 and into the N-type substrate 700 to form a via interface 711. Specifically, an arsenic diffusion will form an electrode 714, such as a drive electrode 226 or a sense electrode 228. The arsenic diffusion will also form a base portion 744 of a central anchor 212. Arsenic is a preferred dopant in the present method since it is a slow diffuser, and will not spread significantly during subsequent thermal processing of the substrate. This reduces the potential for the closing of small gaps due to inadvertent diffusion.

Figure 15C:
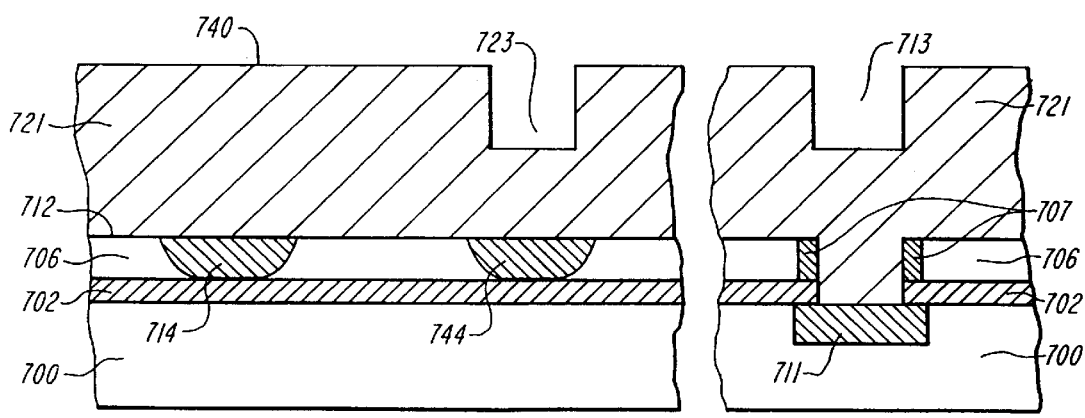
FIG. 15C illustrates a further step of the fabrication begun in FIG. 15A.

As illustrated in FIG. 15C, the present process calls for a single P-type epitaxial layer 721 deposition on the exposed surface 712 of the thin P layer 706. With reference to the completed accelerometers of FIGS. 8A, 8B, 8C, 9A and 9B, the thickness of the P type epitaxial layer is equal to an electrode gap between a flexible element 222 and either the drive or sense electrodes 226, 228 plus the thickness of the proof mass 220 suspended thereover.

As shown in FIG. 15C, a pit 723 is etched into an exposed surface 740 of the P type epitaxial layer 721. The depth of the pit 723 is roughly equivalent to the desired electrode gap 750 thickness in the finished device. Each pit 723 is positioned in the surface of the P type epitaxial layer over a respective anchor base portion 744.

A via doping etch pit 713 is also formed into the exposed surface 740 of the P-type epitaxial layer 721. This doping etch pit 713 will enable the diffusion of a second dopant into contact with the via interface 711 formed of arsenic.

Figure 15D:
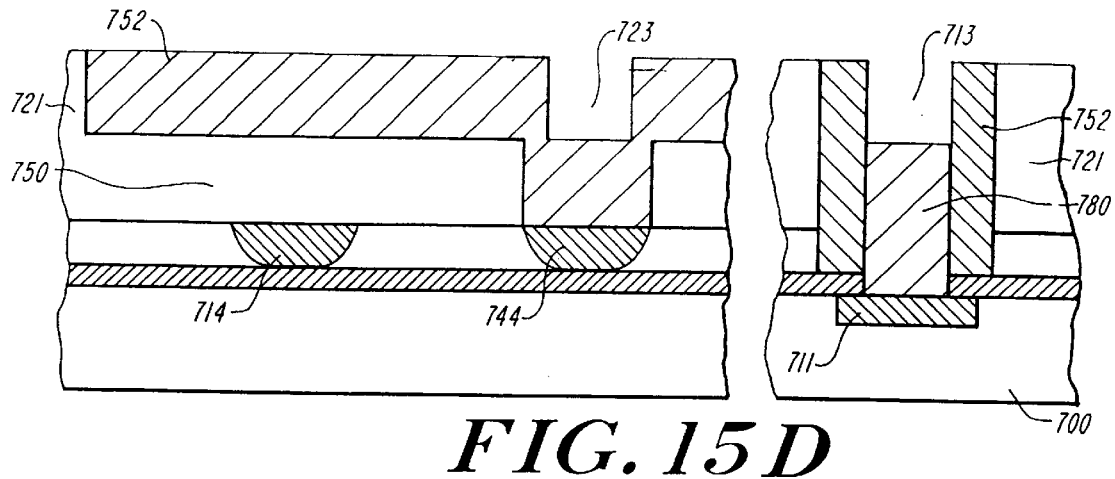
FIG. 15D illustrates a further step of the fabrication begun in FIG. 15A.

The next step, as illustrated in FIG. 15D, includes oxidizing and photolithographically patterning the exposed surface 740 of the epitaxial layer 721 to enable selective phosphorous doping into the epitaxial layer 721 to form an N doped device region 752. Where a pit 723 has been etched, the diffusion goes through the epitaxial layer 721 and all the way to the underlying anchor base portion 744. The electrode gap 750 between the N doped region 752 and previously doped electrodes 714 is thus defined by the distance between the leading edge of the doped region 752 and a proximate surface of the underlying electrode 714.

The via etch pit 713 formed in the P epitaxial layer enables the diffusion of the phosphorous down to the arsenic via interface 711 in the N substrate 700. Together, the arsenic doped via interface 711 and the overlying phosphorous doped via etch pit 713 form the via 716 itself.

Figure 15E:
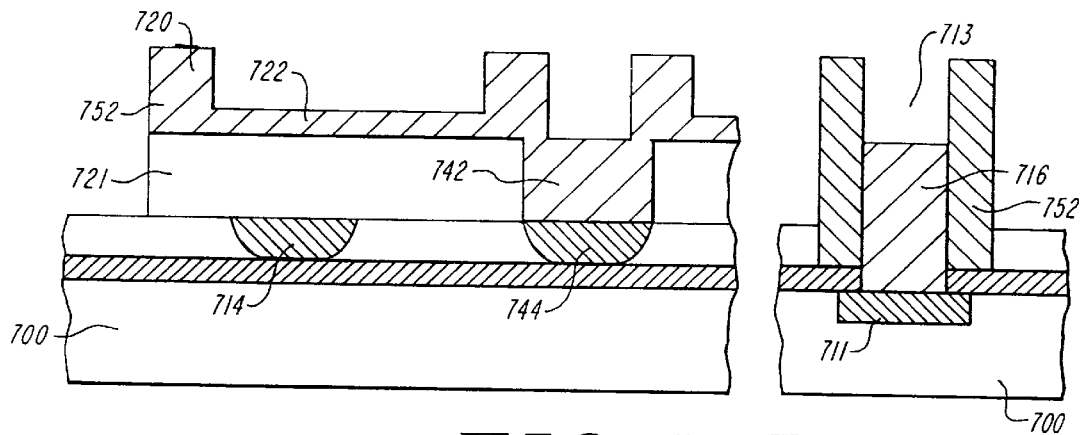
FIG. 15E illustrates a further step of the fabrication begun in FIG. 15A.

The epitaxial layer 721, including the phosphorous doped N region 752, is masked in a manner known in the art, such as by photoresist and/or metal mask and may additionally be patterned using RIE. Thus, as shown in FIG. 15E, the peripheral proof mass 720, flexible elements 722, the anchor body 742 and via 716 are defined.

An advantage of this process is that only one epitaxial layer 721 deposition is required. Further, formation of the proof mass 720 and flexible elements 722 with respect to the already formed electrodes 714 occurs under ideal alignment conditions, resulting in highly accurate alignment. This is in contrast to methods involving anodic bonding of a device formed of a silicon wafer and an insulating substrate such as glass.

It is at this stage that metallization for interconnects is deposited and patterned. TiW, Pd, and Au are suitable sequential materials for these purposes. The areas where wire bonding is to take place are built up in a fashion similar to the proof mass so that metallization takes place on the top surface of the epitaxial layer 721 prior to electrochemical etch.

Figure 15F:
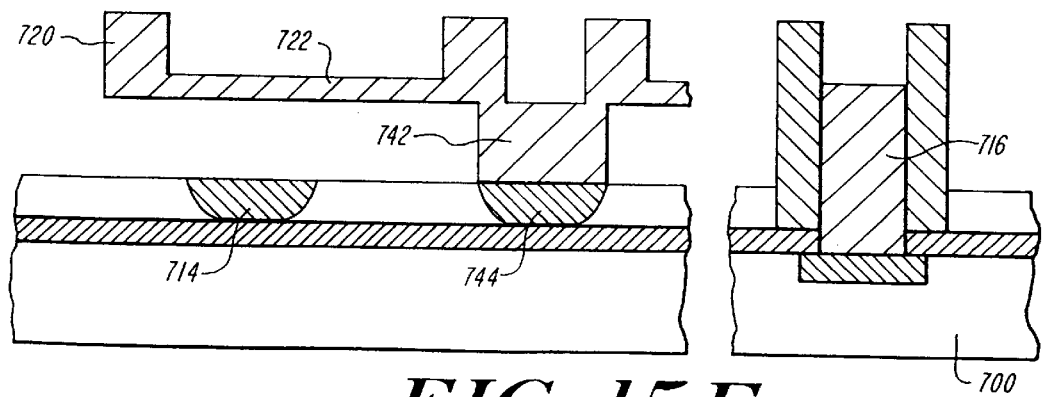
FIG. 15F illustrates a further step of the fabrication begun in FIG. 15A.

The structure formed thus far is next subjected to electrochemical etching. This process is carried out by connecting the N type material to an anode of a power source (not shown), and exposing the structure to a KOH solution carrying a negative charge. This will etch away P doped silicon, while leaving N doped silicon in place. Thus, by forming a via 716 between N doped regions 752 and the N substrate 700, the latter can be connected to the anode during KOH exposure, thus leaving behind the transducer device formed of N doped silicon, as illustrated in FIG. 15F.

Note that the representations of the devices in FIGS. 15A through 15F are not to scale, particularly with respect to the width of the proof mass 720, the length of the flexible elements 722, and the width of the anchor body 742. Further, note that additional steps are required to form flexible elements 722, which are a different thickness than the proof mass 720. These may include separate diffusion or RIE steps.

Once the electrochemical process has been completed, a laser or other suitable means can be employed to sever an interconnection (not shown) between the via 716 and the remainder of the N doped structure 752 to disconnect the substrate layer 700 and the transducer device.

An analogous process to that just described can be used to fabricate a vibrating beam accelerometer in polysilicon, according to the invention. A virtually identical starting wafer can be used to implement the polysilicon device, as used and described with respect to FIG. 15A. In such a polysilicon process, P+ and N polysilicon are substituted for the single crystal epitaxially grown layer.

Similarly, a polysilicon device can be fabricated using a starting wafer of nitride coated silicon. Again, in such a polysilicon device, P+ and N polysilicon are substituted for the single crystal epitaxially grown layers.

A fourth method for fabricating micromechanical devices such as gyroscopes and accelerometers, including the vibrating beam accelerometer embodiments as disclosed herein, is a double epitaxial layer electrochemically etched silicon process. Referring to FIGS. 16A–16F, fabrication of the monolithic, micromechanical vibrating beam accelerometer of FIG. 8A begins with a similar SOI handle as described with reference to FIGS. 11A and 11B. However, with reference to FIG. 16A, a starting wafer 810 consisting of an N-type silicon wafer 800 and an oxide or nitride surface layer 802 is wafer bonded to a thin P-type layer 806 of a wafer 804 consisting of the P-type layer 806 and an N-type "handle" layer 808. The N-type layer 808 is then removed by lapping or polishing. As noted, substrates of this type are commercially available and are known as SOI (silicon-on-insulator) wafers.

The comments made above with respect to fabrication of more than one device on one such starting wafer, as illustrated in FIGS. 12 and 13, are equally applicable to the presently disclosed process.

Figure 16A:
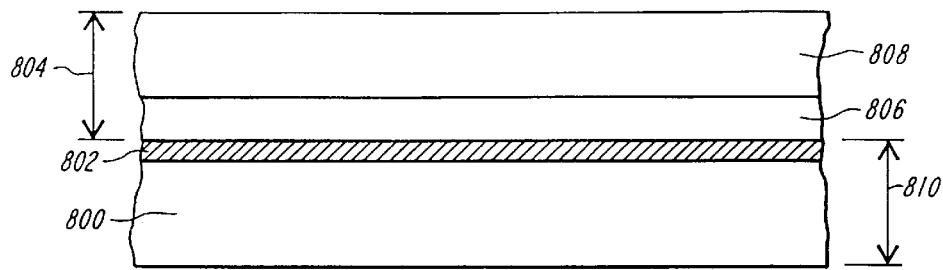
FIG. 16A illustrates a representative cross-sectional view of fabrication of the micromechanical vibrating beam accelerometer of FIG. 10 according to a two epitaxial layer electrochemical process.
Figure 16B:
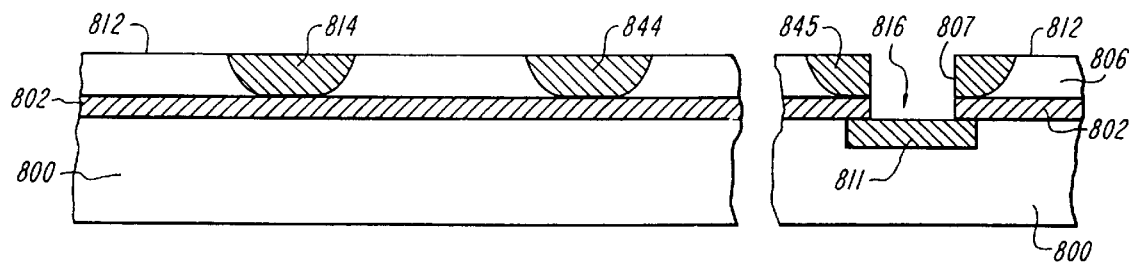
FIG. 16B illustrates a further step of the fabrication begun in FIG. 16A.

With reference to FIG. 16B, a fabrication process will be described which relies on arsenic and phosphorous doping as an electrochemical etch stop. KOH (potassium hydroxide) is one example of an etchant employed. A window is patterned on an exposed surface 812 of the thin P layer 806, and a via 816 is etched through the thin P layer 806 and the oxide or nitride layer 802, exposing the N substrate 800. This forms the basis for a via 816 which will eventually enable electrical interconnection of N-type device elements, described hereinafter, with the N-type substrate 800. Generally, one such via 816 is provided for each device on the wafer, though more or less can be employed. The role of this interconnection in electrochemical etching will be discussed.

The exposed surface 812 of the thin P layer 806 is oxidized and photolithographically patterned to enable selective arsenic diffusion into the thin P layer 806 and into the via 816. The diffusion goes completely through the P layer 806, leaving a thin N layer on the walls 807 of the via 816, and results in an arsenic concentration at the oxide interface 802. The diffusion also goes through the via 816 and into the N-type substrate 800 to form a via interface 811. The immediate vicinity of the via 816 is also doped N type. In addition, interconnections 845, discussed later, are diffused to interconnect all N regions to the substrate via 811.

Specifically, an arsenic diffusion will form an electrode 814, such as a drive electrode 226 or a sense electrode 228. The arsenic diffusion will also form a base portion 844 of a central anchor 212. Interconnections 845 are also formed at the same time and in the same manner as the electrodes 814 and serve to electrically connect all N regions to be protected to the substrate at the via 816. Arsenic is a preferred dopant in the present method since it is a slow diffuser, and will not spread significantly during subsequent thermal processing of the substrate. This reduces the potential for the closing of small gaps due to inadvertent dopant diffusion.

Figure 16C:
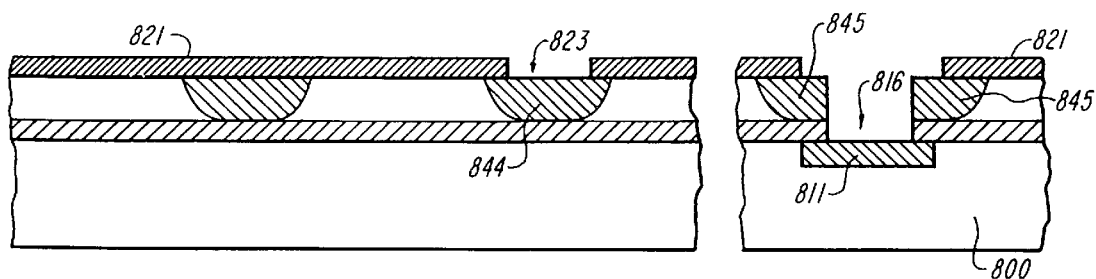
FIG. 16C illustrates a further step of the fabrication begun in FIG. 16A.

As illustrated in FIG. 16C, the present process calls for a first P-type epitaxial layer 821 deposition on the exposed surface 812 of the thin P layer 806. With reference to the completed accelerometers of FIGS. 8A, 8B, 8C, 9A and 9B, the thickness of the P type epitaxial layer is equal to an electrode gap between a flexible element 222 and either the drive or sense electrodes 226, 228.

The P-type first epitaxial layer 821 is then etched to form at least one anchor interconnect 823, exposing a segment of the base portion 844 of the central anchor 212 and of all outer anchors 218 (not shown). Each anchor interconnect 823 is positioned in the surface of the P type epitaxial layer over a respective anchor base portion 844. Since electrode gaps for multiple devices located on the same wafer are created simultaneously by deposition of one epitaxial layer 821, enhanced uniformity of gap thickness is achieved. The P-type first epitaxial layer 821 is also etched in the area of the via 816 to expose the arsenic doped via interface 811.

Figure 16D:
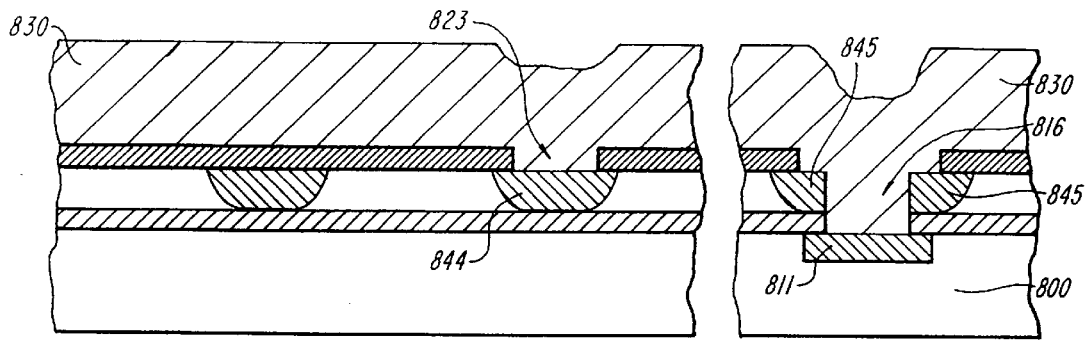
FIG. 16D illustrates a further step of the fabrication begun in FIG. 16A.

Once anchor interconnects 823 and vias 816 are etched through the P-type first epitaxial layer 821, a phosphorous doped second epitaxial layer 830 is deposited to a thickness desired for the peripheral proof mass 820, as in FIG. 16D. The N-type second epitaxial layer 830 is deposited into the anchor interconnects 823, making contact with the anchor base portion 844. The second epitaxial layer 830 is also deposited into the via 816, establishing electrical communication between the N-type second epitaxial layer 830 and the N-type substrate 800 through the via interface 811. Layer 830 also establishes an electrical connection between via interface 811 and interconnections 845.

Figure 16E:
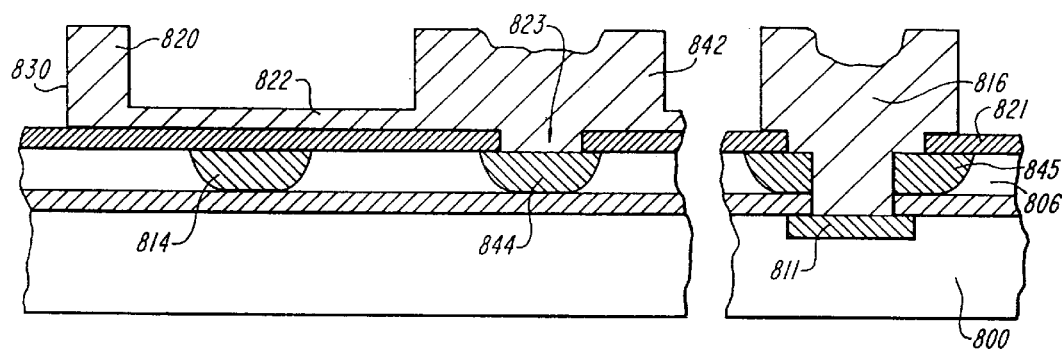
FIG. 16E illustrates a further step of the fabrication begun in FIG. 16A.

The N-doped second epitaxial layer 830 is used to form the majority of the suspended part of the accelerometer of FIGS. 8A, 8B, 8C, 9A, 9B and 10. This layer 830 is masked in a manner known in the art, such as by photoresist and/or metal mask, and patterned using reactive ion etching (RIE). Thus, as shown in FIG. 16E, the peripheral proof mass 820, flexible elements 822, and anchor body 842 are formed, and the anchor body 842 is bonded to the anchor base 844 through the anchor interconnect 823. Note that additional steps are required to form flexible elements 822, which are a different thickness than the proof mass 820. These may include separate diffusion or RIE steps.

An advantage of this process is that formation of the proof mass 820 and flexible elements 822 with respect to the already formed electrodes 814 occurs under ideal alignment conditions, resulting in highly accurate alignment. This is in contrast to methods involving anodic bonding of a device formed of a silicon wafer and an insulating substrate such as glass.

It is at this stage that metallization for interconnects is deposited and patterned. TiW, Pd, and Au are suitable sequential materials for these purposes. The areas where wire bonding is to take place are built up in a fashion similar to the proof mass so that metallization takes place on the top surface of the second epitaxial layer 830 prior to electrochemical etch.

Figure 16F:
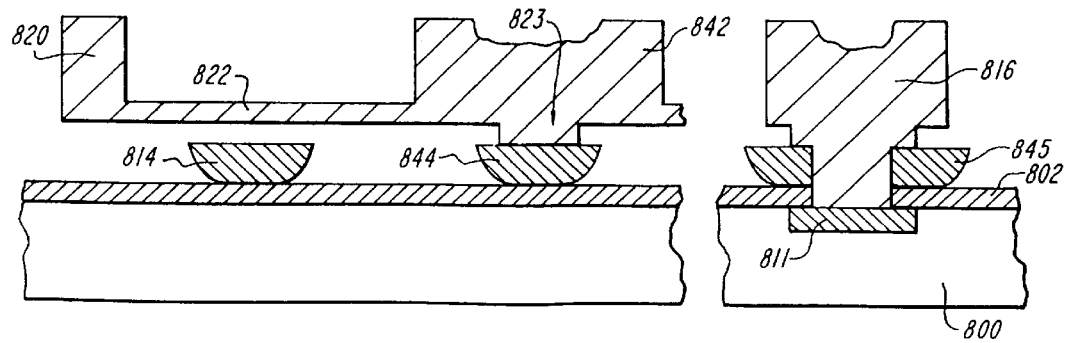
FIG. 16F illustrates a further step of the fabrication begun in FIG. 16A.

The structure formed thus far is next subjected to electrochemical etching. This process is carried out by connecting the N-type material to an anode of a power source (not shown), and exposing the silicon structure to a KOH solution carrying a negative charge. This will etch away P-type silicon, while leaving N-type silicon in place. By forming a via 816 between N-type device regions and the N substrate 800, the latter can be connected to an anode during KOH exposure, thus leaving behind the transducer device formed of N doped silicon, as illustrated in FIG. 16F. Note that the representations of the devices in FIGS. 16A through 16F are not to scale, particularly with respect to the width of the proof mass 820, the length of the flexible elements 822, and the width of the anchor body 842.

Once the electrochemical process has been completed, a laser or other suitable means may be employed to sever interconnections 845 between the via 816 and the remainder of the N-type structure to prevent coupling of the substrate 800 to the transducer device.

An analogous process to that just described can be used to fabricate a vibrating beam accelerometer in polysilicon, according to the invention. A virtually identical starting wafer can be used to implement the polysilicon device, as used and described with respect to FIG. 16A. In such a polysilicon process, P+ and N polysilicon are substituted for the single crystal epitaxially grown layer.

Similarly, a polysilicon device can be fabricated using a starting wafer of nitride coated silicon. Again, in such a polysilicon device, P+ and N polysilicon are substituted for the single crystal epitaxially grown layers.

It is noted that the methods described with respect to FIGS. 14A–F, 15A–F, and 16A–F can all be used to fabricate the accelerometer 340 and gyroscope 350 triads illustrated in FIGS. 12 and 13 in a fashion similar to that described in conjunction with the method of FIGS. 11A–11F.

One of the benefits of employing the electrochemical processes as described with respect to FIGS. 15A–F and 16A–F is that by avoiding the high dopant concentrations required for the dissolved silicon processes of FIGS. 11A–F and 14A–F, the resulting transducer structure is less prone to developing internal strain.

An advantage of using the substrate as a common electrical connection for electrochemical etching is that a heavily doped N type substrate may be used to minimize ohmic drops across the wafer. Some current always flows during the electrochemical etch. Thus, ohmic drops will vary the bias on the regions to be protected causing some of them to etch improperly.

Although specific features of the invention are shown in some drawings and not in others, this is for convenience only as each feature may be combined with any or all of the other features in accordance with the invention.

Modifications and substitutions of the present invention by one of ordinary skill in the art are considered to be within the scope of the present invention, which is delineated except by the claims which follow.

I claim:

1. An accelerometer for detecting acceleration along at least one acceleration sensitive axis comprising:
   a substrate having a first surface;
   at least two electrodes disposed on said substrate first surface;
   at least one central anchor disposed on said substrate first surface;
   at least two flexible elements extending from said at least one central anchor, above and substantially parallel to said substrate first surface;
   at least two support member anchors disposed on said substrate first surface;
   at least two support members each extending from a respective support member anchor, above and substantially parallel to said substrate first surface, and orthogonal to said at least one acceleration sensitive axis; and
   a peripherally suspended proof mass disposed about said at least one central anchor, said proof mass suspended above and substantially parallel to said substrate first surface by said at least two flexible elements and said at least two support members and having an inner surface and an outer surface,
   wherein each of said at least two flexible elements is generally collinear with said at least one acceleration sensitive axis and disposed proximate a respective one of said at least two electrodes formed on said substrate first surface.

2. The accelerometer of claim 1, wherein
   said at least two, support member anchors further comprise at least two outer support anchors disposed on said substrate first surface, and
   said at least two support members comprise at least two outer support members each disposed between said outer surface of said peripherally suspended proof mass and a respective one of said at least two outer support anchors.

3. The accelerometer of claim 2 wherein said at least two outer support anchors each further comprise a respective outer support beam, each in communication with at least one of said at least two outer support members.

4. The accelerometer of claim 3 wherein said outer support anchors are disposed on said substrate first surface collinear with said at least one central anchor.

5. The accelerometer of claim 3 wherein a stress relief member is interposed between each of said outer support members and said respective outer support beam.

6. The accelerometer of claim 1 wherein each of said at least two support members offer minimal resistance to translation of said peripherally suspended proof mass along said at least one acceleration sensitive axis.

7. The accelerometer of claim 1 further comprising at least one rebalance electrode disposed on said substrate first surface proximate said outer surface of said peripherally suspended proof mass and generally orthogonal to said at least one acceleration sensitive axis.

8. The accelerometer of claim 7 wherein said at least one rebalance electrode imparts an electromagnetic force on said peripherally supported proof mass.

9. The accelerometer of claim 7 wherein said at least one rebalance electrode imparts an electrostatic force on said peripherally supported proof mass.

10. The accelerometer of claim 1 wherein said at least two electrodes are each comprised of a drive electrode and a sense electrode.

11. The accelerometer of claim 10 wherein said drive electrode consists of complimentary positive and negative drive electrodes.

12. The accelerometer of claim 10 wherein said at least two flexible elements have a high height to width ratio and flex in a direction generally orthogonal to said at least one acceleration sensitive axis and parallel to said substrate first surface.

13. The accelerometer of claim 12 wherein said drive and sense electrodes of each of said at least two electrodes are disposed proximate to and on opposing sides of each of said at least two flexible elements.

14. The accelerometer of claim 10 wherein said at least two flexible elements have a low height to width ratio and said at least two flexible elements flex in a direction generally normal to said substrate first surface.

15. The accelerometer of claim 14 wherein said sense electrode and said drive electrode of each of said at least two electrodes are disposed on said substrate first surface, proximate to and beneath a respective one of said at least two flexible elements.

16. The accelerometer of claim 1, wherein said at least two flexible elements are selected from the group consisting of beams, and ribbons.

17. The accelerometer of claim 1, wherein said at least two flexible elements are thinner than the thickness of said peripherally suspended proof mass.

18. The accelerometer of claim 1, wherein said at least two support members comprise at least two inner support members disposed between an inner surface of said peripherally suspended proof mass and said at least one central anchor.

19. The accelerometer of claim 18 wherein a stress relief member is interposed between each of said inner support members and said inner surface of said peripherally suspended proof mass.

20. The accelerometer of claim 1 wherein a stress relief member is interposed between each of said flexible elements and said inner surface of said peripherally suspended proof mass.

21. The accelerometer of claim 1, wherein said at least two support members comprise at least two inner support members, disposed between an inner surface of said peripherally suspended proof mass and said at least one central anchor, and at least two outer support members, disposed between said outer surface of said peripherally suspended proof mass and said support member anchors.

22. The accelerometer of claim 21, further comprising at least two outer support beams, each in communication with at least one of said at least two outer support members and with one of said at least two support member anchors.

* * * * *